US012809812B2

(12) United States Patent
Francois et al.

(10) Patent No.: US 12,809,812 B2
(45) Date of Patent: Nov. 24, 2026

(54) SELECTIVE CONTROLLER REBROADCAST

(71) Applicant: International Business Machines Corporation, Armonk, NY (US)

(72) Inventors: Avery Francois, East Schodack, NY (US); Vesselina Papazova, Highland, NY (US); Jie Zheng, Poughkeepsie, NY (US); Ekaterina M. Ambroladze, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 18/978,127

(22) Filed: Dec. 12, 2024

(65) Prior Publication Data

US 2026/0169952 A1 Jun. 18, 2026

(51) Int. Cl.
*G06F 15/78* (2006.01)
*G06F 9/4401* (2018.01)

(52) U.S. Cl.
CPC ........ *G06F 15/7821* (2013.01); *G06F 9/4401* (2013.01)

(58) Field of Classification Search
CPC ........ G06F 15/78; G06F 15/7821; G06F 9/52; G06F 9/4401; G06F 21/57; G06F 12/084; G06F 12/0811; G06F 12/0813; G06F 12/0831; G06F 12/0833; G06F 12/0857; G06F 3/067; G06F 3/0604; G06F 3/0631; G06F 3/0647
USPC .......................................................... 709/209
See application file for complete search history.

(56) References Cited

U.S. PATENT DOCUMENTS

| | | | | |
|---|---|---|---|---|
| 7,596,108 | B2 * | 9/2009 | Olexa | H04H 60/11 370/312 |
| 10,489,294 | B2 * | 11/2019 | Blake | G06F 12/0831 |
| 10,944,669 | B1 * | 3/2021 | Ramanathan | H04L 45/02 |
| 11,523,254 | B2 * | 12/2022 | Deixler | G01S 7/006 |
| 2015/0254182 | A1 * | 9/2015 | Asher | G06F 12/0815 711/135 |

(Continued)

OTHER PUBLICATIONS

"Improving Broadcast Targeting via Personalization", an IP.com Prior Art Database Technical Disclosure, IP.com No. IPCOM000267684D, IP.com Electronic Publication Date: Nov. 15, 2021, 6 pages, Copyright: Copyright 2021 PT Tokopedia.

(Continued)

*Primary Examiner* — James N Fiorillo
(74) *Attorney, Agent, or Firm* — Scully, Scott, Murphy & Presser, P.C.

(57) ABSTRACT

A controller of a chip on a drawer having multiple chips, broadcasts to other chips on the drawer, a message to initiate a search for a cache line among the multiple chips. The controller of the chip receives partial responses that indicate status of the search on the other chips on the drawer. The controller of the chip generates a combined response based on the partial responses, and sends the combined response to the other chips on the drawer that did not return a reset indication with the status. The controller of the chip rebroadcasts selectively the message to only the other chips on the drawer that returned the reset indication with the status. The combined response can be used to have remote chips research the caches without having to wait for rebroadcast when no reset indication was returned.

25 Claims, 20 Drawing Sheets

(56) References Cited

U.S. PATENT DOCUMENTS

| | | | | |
|---|---|---|---|---|
| 2015/0254183 | A1* | 9/2015 | Akkawi | G06F 12/0813 711/135 |
| 2015/0254207 | A1* | 9/2015 | Kessler | G06F 13/10 710/39 |
| 2015/0261587 | A1* | 9/2015 | Fee | G06F 11/1415 719/313 |
| 2016/0147661 | A1* | 5/2016 | Ambroladze | G06F 12/0817 711/130 |
| 2018/0293172 | A1* | 10/2018 | Blake | G06F 12/0811 |
| 2018/0365070 | A1* | 12/2018 | Blake | G06F 9/5016 |
| 2020/0264797 | A1* | 8/2020 | Kohl | G06F 12/0817 |
| 2023/0085998 | A1* | 3/2023 | Zheng | G06F 1/24 710/310 |

OTHER PUBLICATIONS

Asghari, et al., "Optimal Local and Remote Controllers with Unreliable Uplink Channels", arXiv:1611.07175v2 [cs.SY], Jun. 17, 2018, 43 pgs.

Authors et. al., "Dynamically enable/disable I/O drawer communication when installing/removing high end storage system I/O drawers", an IP.com Prior Art Database Technical Disclosure, IP.com No. IPCOM000257704D, IP.com Electronic Publication Date: Mar. 4, 2019, 5 pgs.

Authors et. al., "Excess Memory Placement for Virtual Machines by Drawers with the Highest Capacity", an IP.com Prior Art Database Technical Disclosure, IP.com No. IPCOM000269854D, IP.com Electronic Publication Date: May 17, 2022, 3 pgs.

Ernst, et al., " Cyclone: A Broadcast-Free Dynamic Instruction Scheduler with Selective Replay", Appears in the 30th Annual International Symposium on Computer Architecture (ISCA-2003), Jun. 2003, 10 pgs.

Tseng, et al., "Byzantine Broadcast Under a Selective Broadcast Model for Single-hop Wireless Networks", Distributed, Parallel, and Cluster Computing, arXiv:1502.00075v1, Jan. 31, 2015, 10 pgs.

* cited by examiner

SELECTIVE CONTROLLER REBROADCAST

BACKGROUND

The present application relates generally to computers and computer processors, and more particularly to memory controllers on integrated circuits.

BRIEF SUMMARY

The summary of the disclosure is given to aid understanding of a computer system and method of selective controller rebroadcast, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

In some embodiments, a method includes broadcasting, by a controller of a chip on a drawer having multiple chips, to other chips on the drawer, a message to initiate a search for a cache line among the multiple chips. The method also includes receiving, by the controller of the chip, partial responses that indicate status of the search on the other chips on the drawer. The method also includes generating, by the controller of the chip, a combined response based on the partial responses. The method also includes sending, by the controller of the chip, the combined response to the other chips on the drawer that did not return a reset indication with the status. The method also includes rebroadcasting selectively, by the controller of the chip, the message to only the other chips on the drawer that returned the reset indication with the status.

In some embodiments, a method includes receiving, by a chip on a drawer having multiple chips, a broadcast of a message to initiate a search for a cache line on the chip, the message being broadcast from another chip on the drawer. The method also includes generating, by the chip, a partial response indicating a status of the search on the chip. The method also includes sending, by the chip, the partial response. The method also includes receiving, by the chip, a combined response that includes combined statuses of the search performed on the multiple chips. The method also includes, based on determining that the combined response includes a rebroadcast indication, performing a retry for the search without having to receive a rebroadcast of the message from that another chip on the drawer.

In some embodiments, a computer system includes a processor set. The computer system also includes a set of one or more computer-readable storage media. The computer system also includes program instructions stored on the one or more computer-readable storage media to cause the processor set to perform operations of one or more methods described herein.

In some embodiments, a computer program product includes one or more computer-readable storage media. The computer program product also includes program instructions stored on the one or more storage media to perform operations of one or more methods described herein.

In some embodiments, a system includes a plurality of chips on a drawer. The system also includes a controller loaded on a chip of the plurality of chips. The controller is configured to perform broadcasting to other chips other than chip on the drawer, a message to initiate a search for a cache line among the multiple chips. The controller is also configured to perform receiving partial responses that indicate status of the search on the other chips on the drawer. The controller is also configured to perform generating a combined response based on the partial responses. The controller is also configured to perform sending the combined response to the other chips on the drawer that did not return a reset indication with the status. The controller is also configured to perform rebroadcasting selectively the message to only the other chips on the drawer that returned the reset indication with the status.

Further features as well as the structure and operation of various embodiments are described in detail below with reference to the accompanying drawings. In the drawings, like reference numbers indicate identical or functionally similar elements.

DETAILED DESCRIPTION

Figure 1:
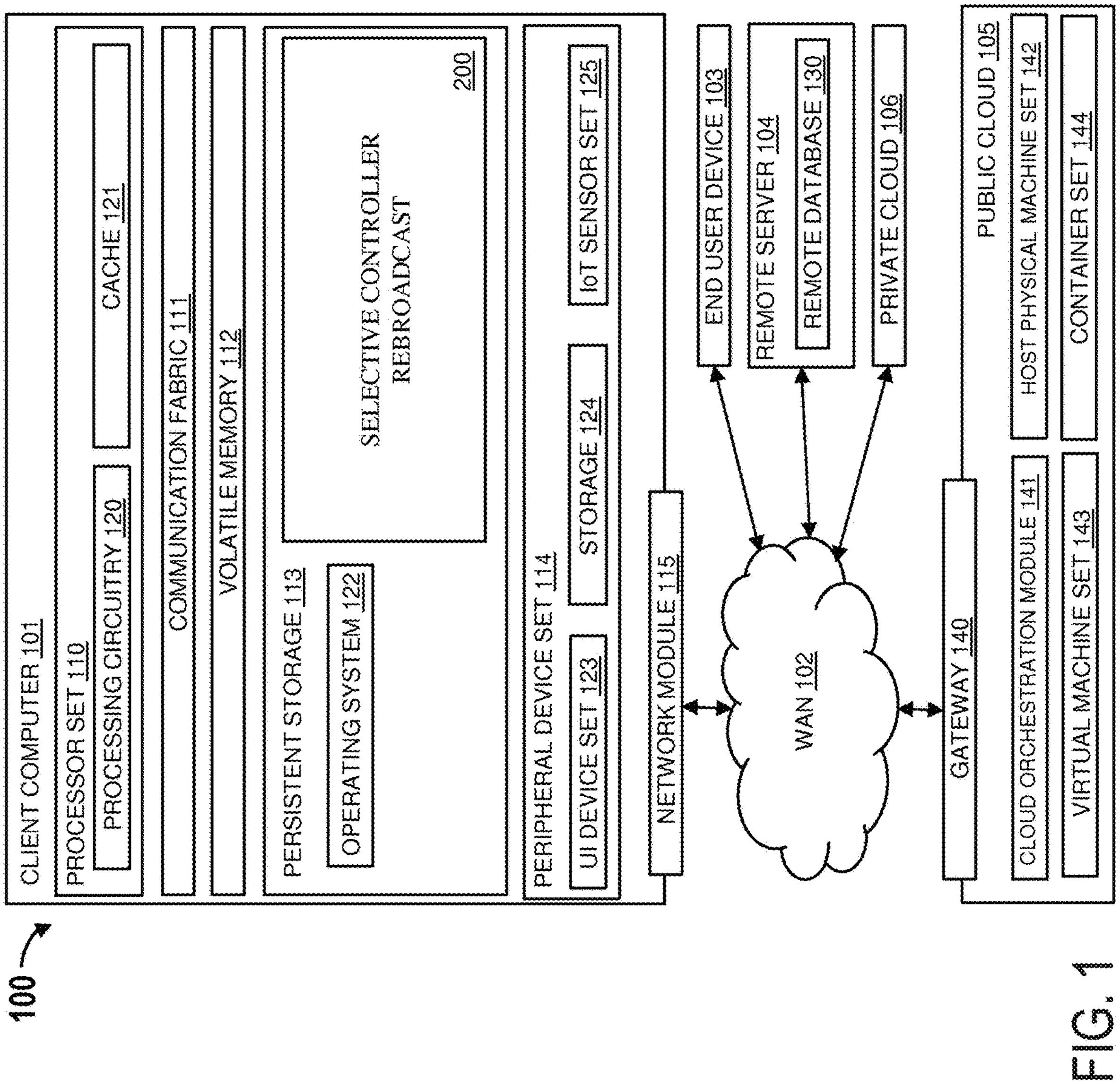
FIG. 1 shows an example of a computing environment, which can implement, run or use selective controller rebroadcast in some embodiments.

In some embodiments, a method includes broadcasting, by a controller of a chip on a drawer having multiple chips, to other chips on the drawer, a message to initiate a search for a cache line among the multiple chips. The method also includes receiving, by the controller of the chip, partial responses that indicate status of the search on the other chips on the drawer. The method also includes generating, by the controller of the chip, a combined response based on the partial responses. The method also includes sending, by the controller of the chip, the combined response to the other chips on the drawer that did not return a reset indication with the status. The method also includes rebroadcasting selectively, by the controller of the chip, the message to only the other chips on the drawer that returned the reset indication with the status.

In this way, a combined response can be used to have remote chips re-search the caches without having to wait for rebroadcast when no reset indication was returned. This is advantageous because it avoids the round trip time of the credit return and/or rebroadcast from the local fetch controller. For example, if there are no other chips that returned the reset indication, no rebroadcast is sent. The method can speed up drawer retry broadcasts to improve on-drawer cache performance.

One or more of the following features can be separable or optional from each other.

In some embodiments, the sending of the combined response causes, responsive to the combined response including a rebroadcast indication, the other chips on the drawer that did not return the reset indication with the status, to separately perform a retry for the search without the controller of the chip having to send a rebroadcast. In this way, retry action being taken by a remote controller (e.g., the other chips) allows for a faster turnaround time in trying to achieve coherency, e.g., after a reject condition occurs.

In some embodiments, the method also includes, responsive to the sending of the combined response, waiting, by the controller of the chip, for next partial responses from the other chips on the drawer. In this way, for example, a chip may receive another partial response without having to rebroadcast to other chips that did not return a reset indication.

In some embodiments, the rebroadcast of the message to only the other chips on the drawer that returned the reset indication with the status, causes the other chips on the drawer that returned the reset indication with the status to reload and retry the search. In this way, for example, the other chips, which have reset or retired, can reload and retry the search.

In some embodiments, the method further includes causing, by the controller of the chip, the message that is broadcast to be sent to another drawer's chips on another drawer to initiate the search for the cache line among those another drawer's chips. The method further includes waiting, by the controller of the chip, for global partial responses from that another drawer's chips. The method further includes, responsive to receiving the global partial responses that indicate global status of the search on that another drawer's chips, generating, by the controller of the chip, a global combined response based on the global partial responses. The method further includes causing, by the controller of the chip, sending of the global combined response to that another drawer's chips that did not return a reset indication with the global status. The method further includes causing, by the controller of the chip, rebroadcasting selectively of the message to only that another drawer's chips that returned the reset indication with the global status. In this way, for example, a global combined response can be used to also have remote drawer chips re-search the caches without having to wait for rebroadcast when no reset indication was returned. This is advantageous because it avoids the round trip time of the credit return and/or rebroadcast from the local or home drawer fetch controller.

In some embodiments, the controller of the chip communicates with a designated chip on the drawer to cause the message that is broadcasted to be sent to that another drawer's chips on that another drawer, to cause the sending of the global combined response to that another drawer's chips that did not return a reset indication, and to cause the rebroadcasting selectively of the message to only that another drawer's chips that returned the reset indication. In this way, for example, messages can be sent to remote drawer's chips through a designated chip on home drawer, providing efficiency and organization.

In some embodiments, the controller of the chip receives the global partial responses via the designated chip. In this way, for example, messages can be received from remote drawer's chips through a designated chip on home or local drawer, providing efficiency and organization.

In some embodiments, the causing of the sending of the global combined response to those another drawer's chips that did not return a reset indication with the global status, causes, responsive to the global combined response including a rebroadcast indication, that another drawer's chips that did not return a reset indication with the global status, to separately perform a retry for the search without the controller of the chip having to cause to send a rebroadcast. In this way, for example, a retry action being taken by a remote drawer's chip allows for a faster turnaround time in trying to achieve system coherency, e.g., after a reject condition occurs.

In some embodiments, a computer program product that includes one or more computer-readable storage media and program instructions stored on the one or more storage media to perform operations of methods described herein is also provided.

In some embodiments, a computer system including a processor set, one or more computer-readable storage media, and program instructions stored on the one or more computer-readable storage media to cause the processor set to cause to perform operations of methods described herein is also provided.

In some embodiments, a method includes receiving, by a chip on a drawer having multiple chips, a broadcast of a message to initiate a search for a cache line on the chip, the message being broadcast from another chip on the drawer. The method also includes generating, by the chip, a partial response indicating a status of the search on the chip. The method also includes sending, by the chip, the partial response. The method also includes receiving, by the chip, a combined response that includes combined statuses of the search performed on the multiple chips. The method also includes, based on determining that the combined response includes a rebroadcast indication, performing a retry for the search without having to receive a rebroadcast of the message from that another chip on the drawer.

In this way, for example, the chip receiving a combined response can perform re-searching of the caches without having to wait for rebroadcast when no reset indication was returned. This is advantageous because it avoids the round trip time of the credit return and/or rebroadcast from the local fetch controller.

One or more of the following features can be separable or optional from each other.

The method also includes, based on the combined response indicating that the message is to be broadcast to another drawer's chips on another drawer, causing, by the chip, sending of the message to that another drawer's chips on that another drawer, the message that is broadcast to initiate the search for the cache line among that another drawer's chips. The method also includes waiting, by the chip, for global partial responses from that another drawer's chips. The method also includes sending, by the chip, the global partial responses to that another chip on the drawer, the global partial responses that indicate global status of the search on that another drawer's chips. The method also includes waiting, by the chip, for global combined response from that another chip on the drawer. The method also includes causing, by the chip, sending of the global combined response to that another drawer's chips that did not return reset indication with the global status. The method also includes causing, by the chip, rebroadcasting selectively of the message to only that another drawer's chips that returned the reset indication with the global status.

In this way, for example, a global combined response can be used to also have remote drawer chips re-search the caches without having to wait for rebroadcast when no reset indication was returned. This is advantageous because it avoids the round trip time of the credit return and/or rebroadcast from the local or home drawer fetch controller.

In some embodiments, causing the sending of the global combined response causes, responsive to the global combined response including a rebroadcast indication, for that another drawer's chips that did not return reset indication with the global status, to separately perform a retry for the search without having to send a rebroadcast. In this way, for example, retry action being taken by another drawer's chip allows for a faster turnaround time in trying to achieve system coherency.

In some embodiments, a system includes a plurality of chips on a drawer. The system also includes a controller loaded on a chip of the plurality of chips. The controller is configured to perform operations that include broadcasting to other chips other than chip on the drawer, a message to initiate a search for a cache line among the multiple chips. The controller is also configured to perform operations that include receiving partial responses that indicate status of the search on the other chips on the drawer. The controller is also configured to perform operations that include generating a combined response based on the partial responses. The controller is also configured to perform operations that include sending the combined response to the other chips on the drawer that did not return a reset indication with the status. The controller is also configured to perform operations that include rebroadcasting selectively the message to only the other chips on the drawer that returned the reset indication with the status.

In this way, for example, a system can use a combined response to have remote chips re-search the caches without having to wait for rebroadcast when no reset indication was returned. This is advantageous because it avoids the round trip time of the credit return and/or rebroadcast from the local fetch controller.

One or more of the following features can be separable or optional from each other.

In some embodiments, the sending of the combined response, responsive to the combined response including a rebroadcast indication, causes the other chips on the drawer that did not return the reset indication with the status, to separately perform a retry for the search without the controller of the chip having to send a rebroadcast.

In this way, for example, retry action being taken by a remote controller (e.g., the other chips) allows for a faster turnaround time in trying to achieve coherency, e.g., after a reject condition occurs.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as selective controller rebroadcast 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The following terminology is used in the description herein.

CP: Chip. A chip is an integrated circuit (IC), a piece of semiconductor material that contains an electronic circuit, e.g., a small wafer of semiconductor material that has an embedded electronic circuit with electronic components such as transistors.

Home chip: The chip the operation starts on.

Home drawer: The drawer the operation starts on. A drawer is a self-contained enclosure that mounts in a frame and contains chips.

Module: An electronic assembly that integrates multiple chips, e.g., integrated circuits (ICs) or semiconductor dies, for example, onto a single package.

PRESP or presp (stands for partial response): Partial response, which are messages from each chip within a scope (e.g., drawer vs./or system) indicating their response to the address broadcast. Each chip sends a partial response that represents the current state of the targeted address on that chip. In some embodiments, this message includes any cache hit state and its associated level of coherency protection, and also memory access permission if target memory is located on that chip. In some embodiments, the PRESP contains information about cache state, memory access readiness, address contention and resource credit. Resource credit is an indication that a chip is done with its operations and is resetting its controller, that is, the chip's controller is retiring. Only one chip in the system can have the global level of coherency protection which is the highest possible coherency protection. More than one chip in the system can have copy of the data in the cache with lower coherency protection. Only one chip in the system will have the targeted address in memory (dual in-line memory module (DIMM)) which acts as coherency arbitration point in case when no global coherency protection chip is found and there are competing requests for the targeted address.

CRESP or cresp (stands for combined response): A message that carries combined response. A combination of the PRESP's from each chip into a message that lets all chips know the resolution of that scope. By way of example, a combined response includes information from the partial response from the chip with the highest coherency point found while searching the caches. For example, a combined response contains information about the highest coherency point found for the targeted address or if an operation is rejected due to address contention. It can also carry information regarding required retry without a broadcast and final retry.

Snoop message: Snoop or snoop message is a message that contains information regarding the type of operation that needs to be performed and the targeted address of the data that needs to be manipulated by the operation. For example, the snoop can be a fetch command that is trying to bring data into local cache. As another example, it can be a Store type of operation that is trying to change the data associated with the address. It can also be an Invalidate instruction that is trying to get the global coherency point of the data and to upgrade its ownership of the address to exclusive state to the requester such that all other copies of the data need to be invalidated. Snoop message can also be an instruction that is trying to update other characteristics associated with this address.

TM: Ticket manager, central arbiter responsible for controlling off-drawer broadcasting, e.g., from one drawer to another drawer, e.g., home drawer to another drawer.

Fork or fork chip: A chip within a drawer that contains a connection point to another drawer.

Branch or branch chip: The remote chip that a fork connects to.

Remote controller: a controller on a chip that is located remotely from a local chip (e.g., a home chip). A controller runs programs and manages tasks on a chip. Remote controller processes data accesses. Remote Controller works in tandem with local controller to ensure data integrity and data access.

Local fabric controller (also referred to as local controller): a controller on a home chip, e.g., local chip. A controller runs programs and manages tasks on a chip. Local controller processes data accesses. Local controller processes data accesses on behalf of processor core or peripheral devices on or attached to the home chip. Local controller has a role of ensuring data integrity.

Systems, methods, and techniques described herein in various embodiments provide an ability of a remote controller to perform retry actions if no resource credit or speculative resource credits were returned on partial response instead of having to restart from the local fetch controller. Partial responses from chips (via respective controllers) include their status of the operation, e.g., information about the cache state, address compares, whether the remote controller can be released without having to send any additional messages in case of successful completion of the operation. An indication regarding the controller's ability to reset if no retry is needed is called speculative resource credit. A chip would return a speculative resource credit when the chip is done with a requested operation and is ready to retire or reset. A chip would return a resource credit when the chip is done with a requested operation and has retired or reset. In some embodiments, the process disclosed herein avoids a re-broadcast to a fixed set of known controllers on different chips from a local controller on a single chip, saving chip resources and also time to resolution. For instance, rebroadcasting due to coherency or a lack of resources within remote controller chip caches can be avoided. The process also allows the remote controllers to retry cache line searches independently, and also to break out of a retry loop using a final retry indication. In this way, a controller retry optimization in the cache structures among connected chips within a system can be provided. Also in this way, better controller usage among cache coherent operations in the processor can be provided.

Local fabric controller is a controller in charge of broadcasting any operations (e.g., snoop or snoop message) originating from that chip and maintaining data integrity for the targeted address. Highest point of coherency is a specific cache directory state or memory chip state in case of lack of higher coherency cache directory state that determines which requester can get access to specific storage address. The highest point of coherency chip is used to determine who is allowed to access data in case of competing requests for the same storage address. Local fabric controllers (e.g., a program or logic), when broadcasting on drawer to search for a highest point of coherency, may encounter address compares (e.g., competing requests for the same storage address) or resource rejects that require the operation to start again with the local fabric controller having to rebroadcast across the drawer to retry the operation. This retry on drawer, restarting from the local fabric controller, takes a long time to re-search and load remote controllers across the drawer, uses additional on-drawer snoop broadcast bandwidth, and prolongs overall controller lifetimes. These factors all negatively affect remote system performance within a drawer.

In some embodiments, systems, methods and techniques described herein allow for a full local drawer broadcast (initial broadcast or message to all chips) to occur only once and then selectively on a coherency reject condition (a resolution point where the operation cannot proceed without trying again, meaning coherency was lost) such as an address conflict, or resource reject due to lack of resources (a reject due to a lack resources needed at the present time, such as no controllers available or an interface is too busy). The local fabric controllers can avoid having to re-broadcast fully on drawer and can selectively initiate a rebroadcast on remote controllers through a drawer combined response (cresp), preventing the need to re-broadcast the snoop message to all chips. For example, a complete new local drawer broadcast need not be sent to all chips, but only to selective chips. A new local drawer broadcast may include initial broadcast and may also include new state bits depending on how the last broadcast resolved, e.g., taking state information from the last cresp and including such information in the snoop message.

Currently, when attempting to search for a cache line or coherency state outside of a chip, a processor loads a local fabric controller on the chip, which is responsible for coordinating the search for the cache line of cache memory on drawer among all the other chips on a drawer. When a cache line is not found locally in the caches within a chip or a certain coherency state is not found, the processor that was looking for the line sends a message asking to find the line. By way of example, for context, the processor searches its private L1 cache and then searches the L2 caches on the chip, and if a resolution still was not achieved then the message is sent to what is referred to as the fabric, which is a location on the chip that contains controllers that load based on these messages and coordinate the search in off-chip scope (referred to as the drawer scope) and also off-drawer scope (referred to as the system scope). Within this drawer scope, remote controllers are loaded to the other chips on the drawer responsive to an initial broadcast (e.g., snoop message) that has been broadcast out by the local controller over off-chip interfaces (or buses) to handle the search on their remote chips. The remote controllers are also fabric controllers and act similarly to the local controllers, however, in some embodiments they are not able to initiate home drawer broadcasts. These remote controllers are loaded when the broadcast snoop message arrives over a chip to chip interface. If a reject occurs and the cache line search operation or sequence is unable to proceed (e.g., rejects occur due to a coherency issue such as an address conflict, or due to lack of resources), currently the remote controllers give up, retire, and the sequence is restarted by the local controller starting with a complete rebroadcast of the on-drawer initial broadcast (snoop) to re-load the remote controllers. An example of a reject is an address conflict reject, for example, if there is another operation that is operating on the exact same cache line (same address) and is writing exclusively to that cache line. In this case under coherency rules, it is against the rules to take ownership of this line since there is another operation in progress that has reached the highest point of coherency and is in the process of writing to that cache line. In this case, when the original operation searches for the line, the partial response coming from this chip would indicate that the original operation was rejected. This indication could then set that state on the cresp indication, and on the observance of the cresp, it would be known that the operation was rejected.

In some embodiments, systems, methods and techniques described herein allow the local fabric controller to skip that rebroadcast message to all remote controllers and instead provide a retry indication or communication in the form of a combined response (along with any changed state in the initial broadcast) that is sent to all remote chips. In some embodiments, the remote controller that returned resource credit on its partial response does not receive a combined response. In some embodiments, only remote controller that returned speculative resource credit may wait for a combined response and find out if the retry is needed. In some embodiments, remote controllers that returned resource credit on their partial responses are reloaded via a snoop message. By way of example, a reject indication in a combined response may be sent when there is another operation in flight that managed to get to the chip with the highest coherency point first and is in a process of moving the coherency point or changing the data associated with the targeted address. If a partial response from a chip indicates speculative resource credit, that implies the controller of that chip is ready to reset upon combined response arrival unless the combined response indicates the operation needs to be retried without a snoop rebroadcast. In some embodiments, the retry procedure on the remote controllers will ensure these remote controllers internally release their protection of the targeted address, wait a configurable amount of time to allow any conflicting operation or the cause of the reject to resolve and then re-snoop or search their remote chips automatically using the saved snoop fields without requiring a new snoop message from the local controller. A drawer partial response would then be forwarded to the local controller from the remote controller a second time without the local controller having re-issued the on-drawer snoop. When these new drawer partial responses are turned into a combined response for the drawer this same sequence could occur again until the operation completes successfully or a termination of retries is needed. To preserve this functionality the local fabric controller can indicate a final retry status on its last drawer combined response (e.g., cresp) message to terminate the on-drawer operation by allowing the remote controllers to know that this will be the final retry and therefore continuing to allow the functionality of ending the drawer search and allowing the local controller to reject back to the originating requestor. The final retry status can be included in the combined response definition.

The following figures show example number of chips, modules and drawers in a computer system that implements the techniques described here. It should be understood that any number of chips on drawer, any number of drawers, different connection topologies, different architectural arrangements are possible and contemplated. Hence embodiments of the systems, methods and techniques can operate with different arrangements and topologies of computer or microprocessor components.

Figure 2:
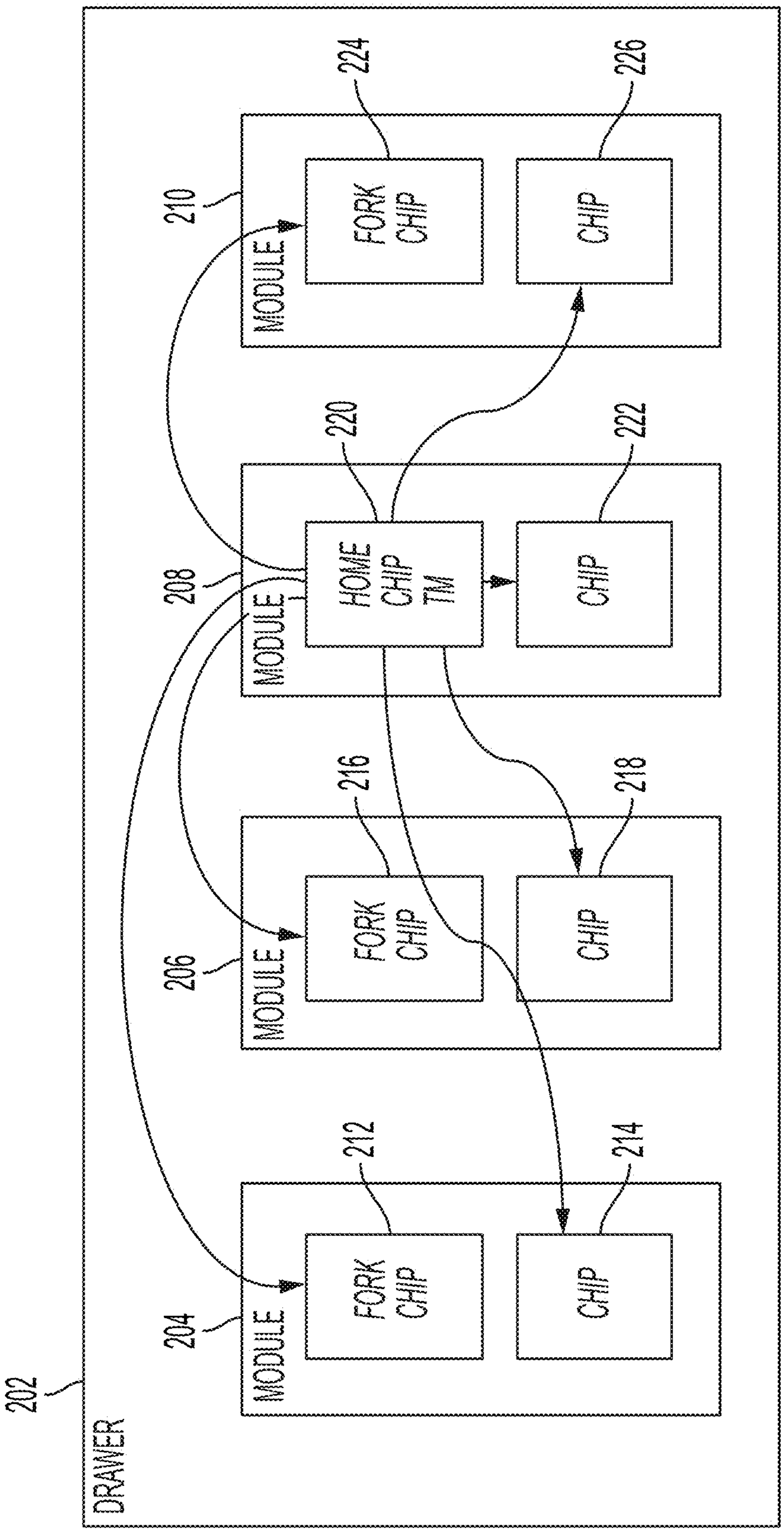
FIG. 2 is a diagram illustrating a home drawer address broadcast flow in some embodiments.

FIG. 2 is a diagram illustrating a home drawer address broadcast flow in some embodiments. Consider that a drawer 202 contains multiple modules 204, 206, 208, 210. Each of the multiple modules contains one or more chips. For example, module 204 contains two chips, 212, 214; Module 206 contains two chips, 216, 218; Module 208 contains two chips, 220, 222; Module 210 contains two chips, 224, 226). Consider that chip 220 on module 208 is a home chip. An operation starts with the home chip 220 loading a local fabric controller on the home chip 220. That local fabric controller initiates an address broadcast to search for a cache line within the drawer 202. The broadcast is sent to all chips within the drawer (scope) 202, by the local fabric controller, e.g., regardless of whether they are located on the same or different module. Broadcast is sent to the chips 212, 214, 216, 218, 220, 224, 226, via a bus that connects chips within the drawer 202. A remote controller is loaded on all other chips on the drawer. For example, in some embodiments, when the snoop arrives on the chip, it searches all caches and loads a remote controller which then helps ensure coherency for that operation. Local controller is the controller that initiates the off-chip broadcast. For example, the local controller is the controller on the home chip that initiates the off-chip broadcast. The remote controller is controller loaded on remote chips or remote drawers by the arriving broadcast. A remote controller is "remote" with respect to the home chip. A remote controller with respect to a chip is a controller on another chip that is remote to the chip. In some embodiments, chips are memory chips; In some embodiments, chips include microprocessor chips.

Figure 3:
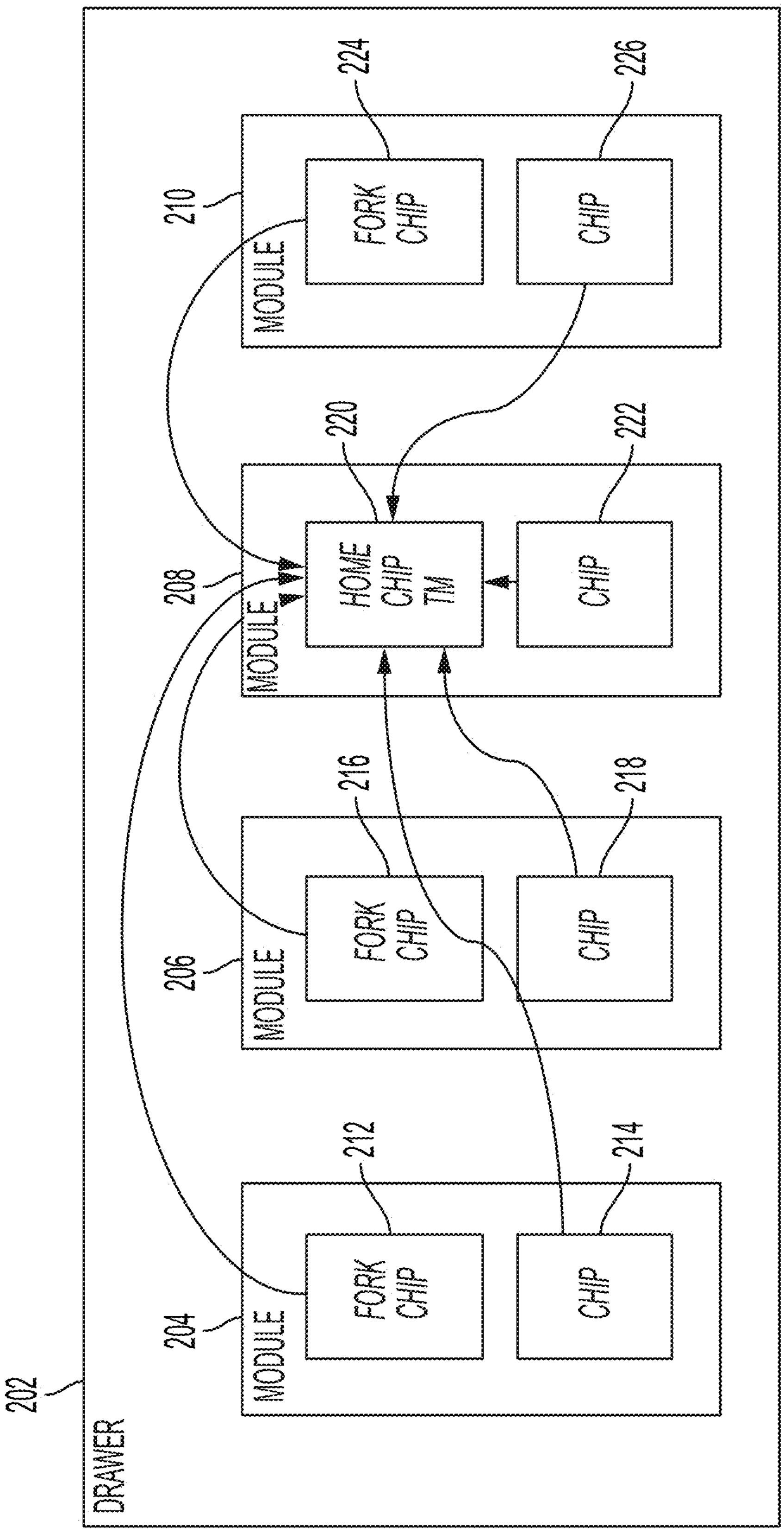
FIG. 3 is a diagram illustrating a home drawer partial message flow in some embodiments.

FIG. 3 is a diagram illustrating a home drawer partial message (e.g., PRESP) flow in some embodiments. After a remote chip (e.g., 218) has observed the address broadcast from the home chip (e.g., 220), that remote chip (e.g., 218) replies with a partial message (e.g., PRESP) back to the home chip indicating the state of all caches on that remote chip (e.g., 218), as shown by the arrow line from 218 to 220. This partial message flow occurs with all of the other chips on the drawer.

Figure 4:
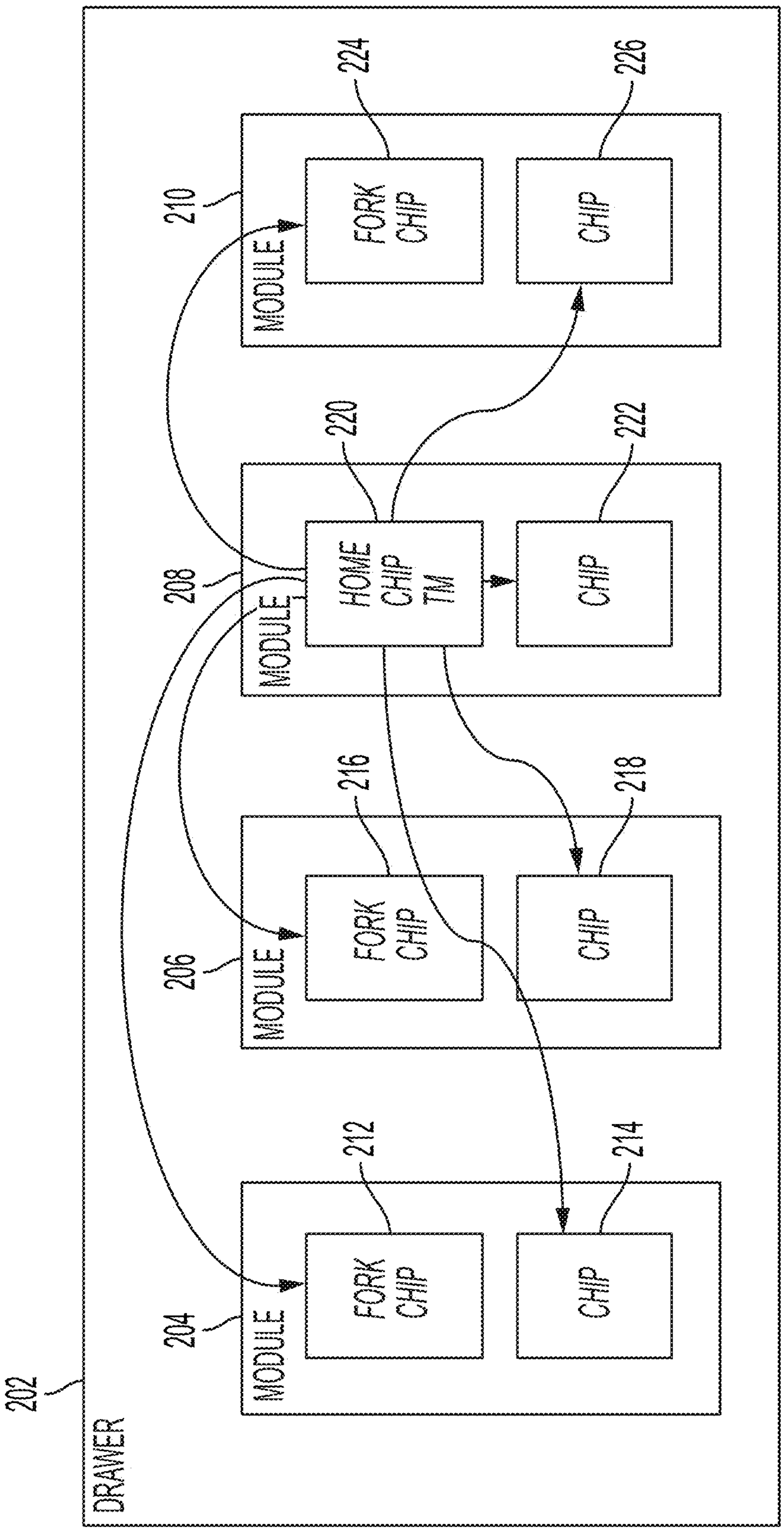
FIG. 4 is a diagram illustrating a drawer combined response flow on home drawer in some embodiments.
Figure 12:
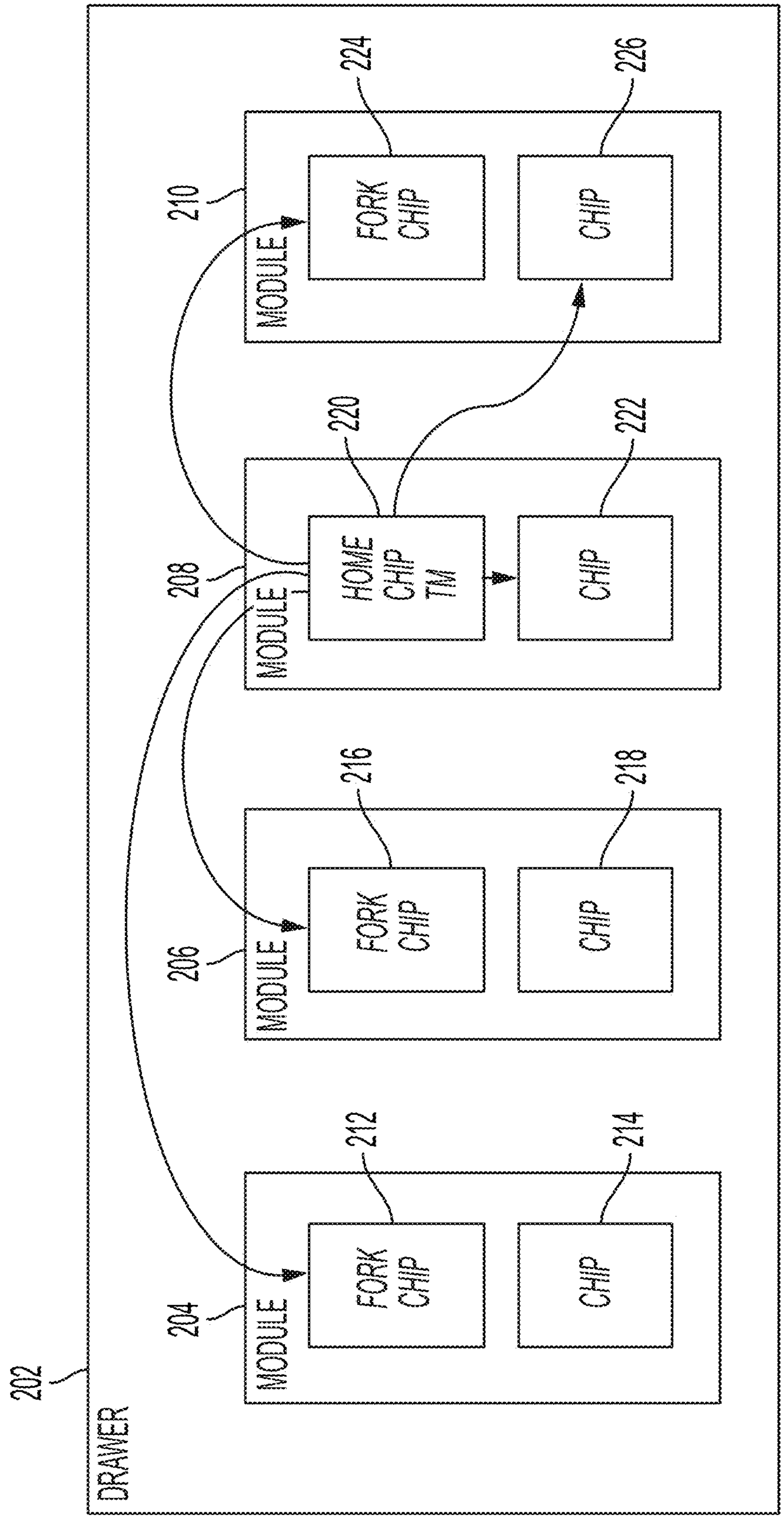
FIG. 12 is a diagram that illustrates a change of flow in combined response flow at home drawer to chips that did not return resource credit on partial response in some embodiments.

FIG. 4 is a diagram illustrating a drawer combined response flow on home drawer in some embodiments. Home drawer is the drawer 202 with the home chip. After the home chip (e.g., 220) collects all partial messages (e.g., PRESPs), the home chip combines the partial messages all into a combined response (e.g., CRESP) message and sends that message out to all still participating chips, as shown by arrow lines. In some embodiments, combined response (e.g., CRESP) message may not be sent if they indicated on their partial message (e.g., PRESP) that they have no coherent interactions needed and their remote controllers retired. Hence, those chips do not need to observe the combined response (e.g., CRESP). This scenario is shown in FIG. 12 described in more detail below. Briefly, interactions are operations that still have to happen due to what was found and provided on the partial response that would require observing the cresp state to continue. For example, interactions may be needed to invalidate other shared copies of the line, interact with remote line tracking states, and/or others. Some chips may provide on the partial response that nothing was found on chip and there is nothing left to do. By providing such indication on the partial response, chip may not require a cresp, and may retire early.

By way of context, if a chip found a point of coherency, e.g., a cache line was found and the directory state of the cache line indicates that it can be altered, moved or updated, then the remote controller who found that point of coherency waits until the cresp arrives. As an example, a cresp may indicate that the sequence was rejected and that the cache line cannot be altered, moved or updated. As another example, the cresp may indicate that the sequence ran into a higher point of coherency and that the cache line cannot be altered, moved or updated. Another example of when a remote controller does not retire after sending PRESP is if an address compare was detected against another operation on that chip and no highest point of coherency is available on that chip. Still yet as another example, the cresp may indicate that this was the highest point of coherency and thus can proceed. The cresp generally lets the remote controller know how to proceed if the chip has something relevant on it. In some cases the snoop broadcast could find a read only copy of a cache line and must stay alive to invalidate that cache line if required by some operations, in which case the remote controller would stay alive to perform that action.

When performing an address broadcast the search for a highest coherent state may result with a success indicated on the combined response (drawer CRESP) message. In that case the TM is not engaged, the operation does not go to the global scope, the coherency resolves, and all controllers finish the operation successfully.

Figure 5:
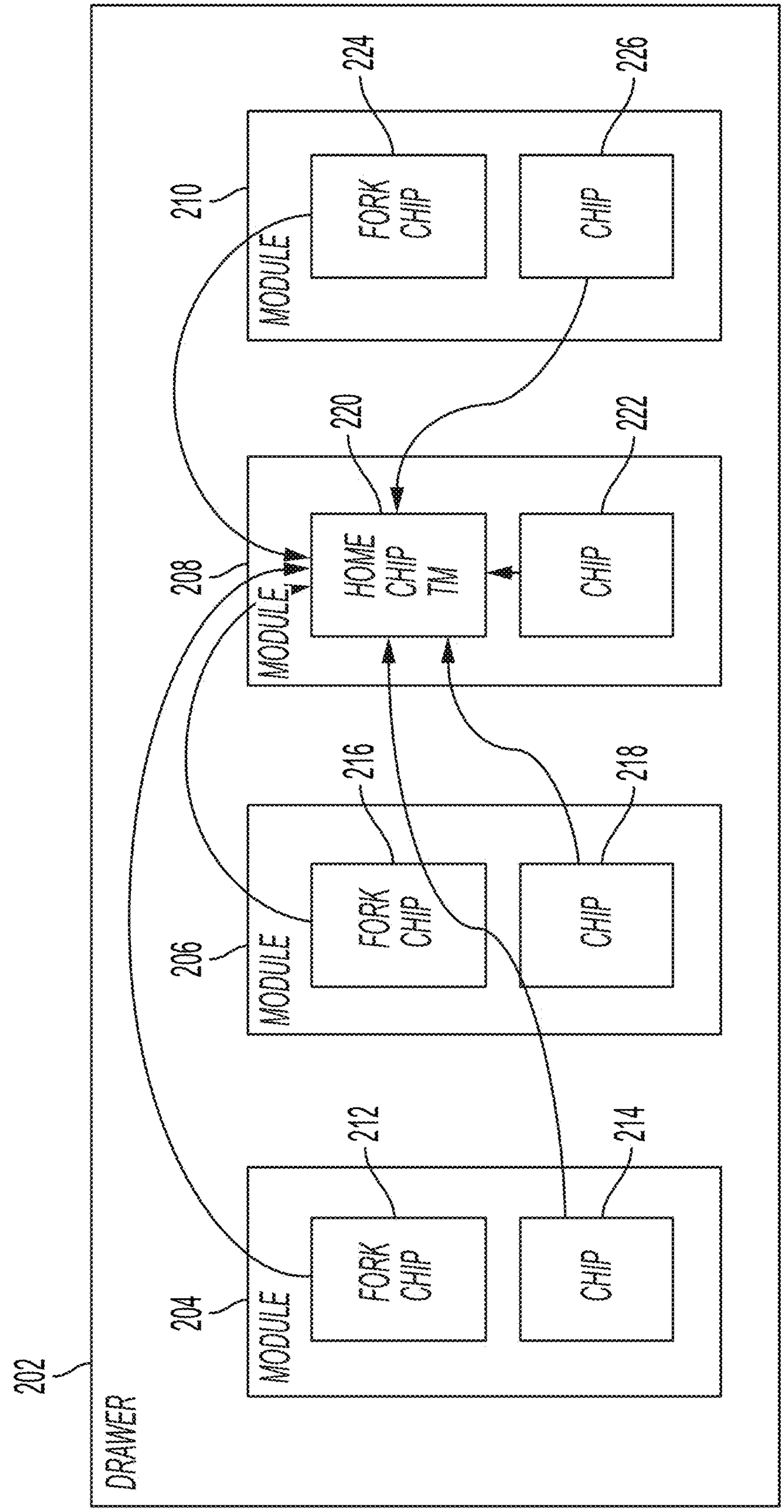
FIG. 5 is a diagram illustrating a final response message flow in some embodiments when no off-drawer broadcast is needed.

FIG. 5 is a diagram illustrating a final response message flow in a broadcast sequence where no off-drawer broadcast is performed in some embodiments. Final response is a message from remote controllers on that drawer that they have completed the operation associated with the broadcast sequence and that they can reset. In some embodiments, final response may also occur when no off-drawer broadcast can be initiated due to address conflict. All chips 212, 214, 216, 218, 222, 224, 226 on drawer 202 return final response to home chip 220 as shown by arrow lines.

Figure 6:
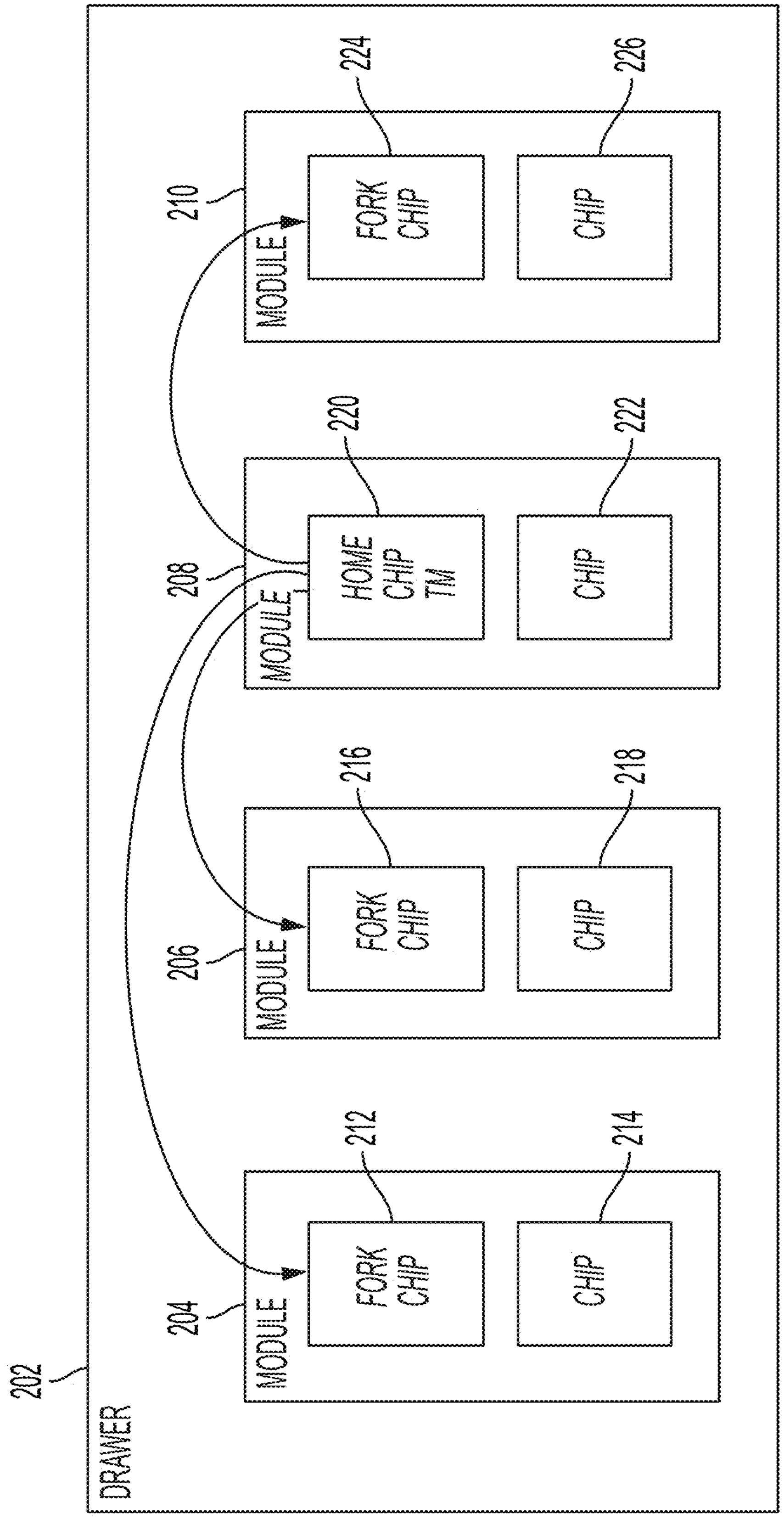
FIG. 6 is a diagram illustrating a drawer ticket flow on home drawer in some embodiments.

FIG. 6 is a diagram illustrating a drawer ticket flow on home drawer in some embodiments. If a highest point of coherency was not found within the drawer 202, the local fabric controller of the home chip (e.g., 220) engages a ticket manager (TM). In some embodiments, the TM chip can be any chip in the drawer. In some embodiments, for a given address there is only one TM chip on home drawer. The highest point of coherency is a chip that provides an indication that this sequence is allowed to proceed and finish with the operation without needing to go to another scope. An example would be that a controller found a cache line whose directory state indicates that the controller can alter, move, update this copy, and no other operations are in the process of doing the same thing that could conflict with this operation. After observing the combined message (e.g., CRESP), the TM on chip 220 eventually grants the controller(s) (remote controller(s)) of the fork chip(s) 212, 216, 224 the ability to broadcast off-drawer (outside of the home drawer 202 to other drawers in a system), where broadcast is performed within the scope of a system (system-wide). The controller(s) of the fork chip(s) 212, 216, 224 engage remote drawers in the search for a coherent state. In this example, chips 212, 216, 224 are all fork chips and are connected to remote drawers (shown in FIG. 7). In some embodiments, a home chip can also operate as a fork chip.

Figure 7:
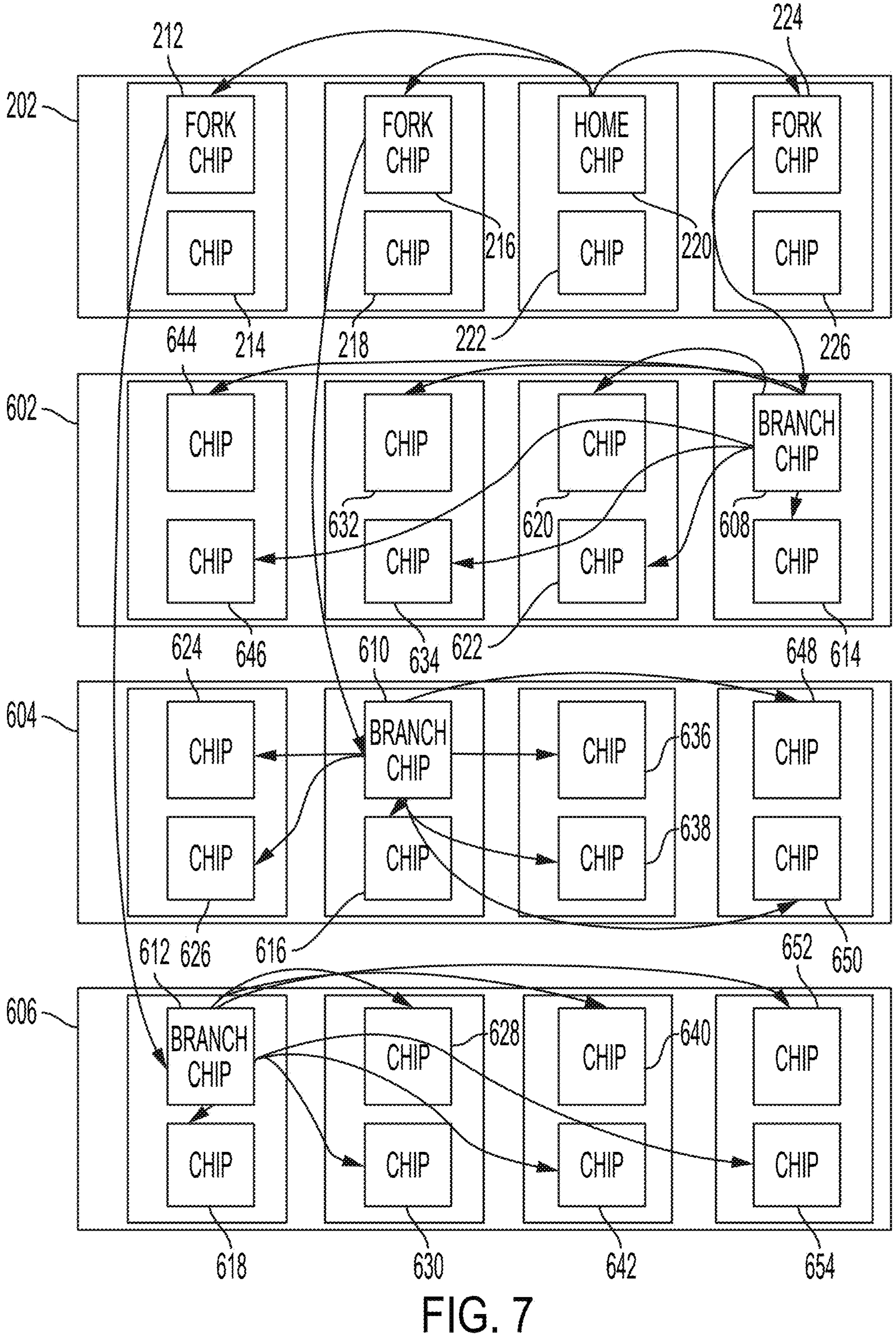
FIG. 7 is a diagram illustrating an off-drawer (global) address broadcast flow in some embodiments.

FIG. 7 is a diagram illustrating an off-drawer (global) address broadcast flow in some embodiments. Consider three remote drawers 602, 604, 606, where each of the remote drawers has multiple modules. Each of the multiple modules can have one or more chips mounted on the modules. Continuing from the description of FIG. 6, the fork chips 212, 216, 224 then broadcast out to remote drawers 602, 604, 606 and load remote controllers on branch chips 608, 610, 612 within the remote drawers 602, 604, 606. A branch chip on a remote drawer then acts similarly to a home chip and searches that remote drawer by broadcasting to all chips within that drawer. For example, each of the remote drawers operate or behave similarly to the drawer described with reference to FIG. 4 and FIG. 6, with the branch chips acting as home chips on their respective remote drawers. This process is referred to as global or system scope.

Figure 8:
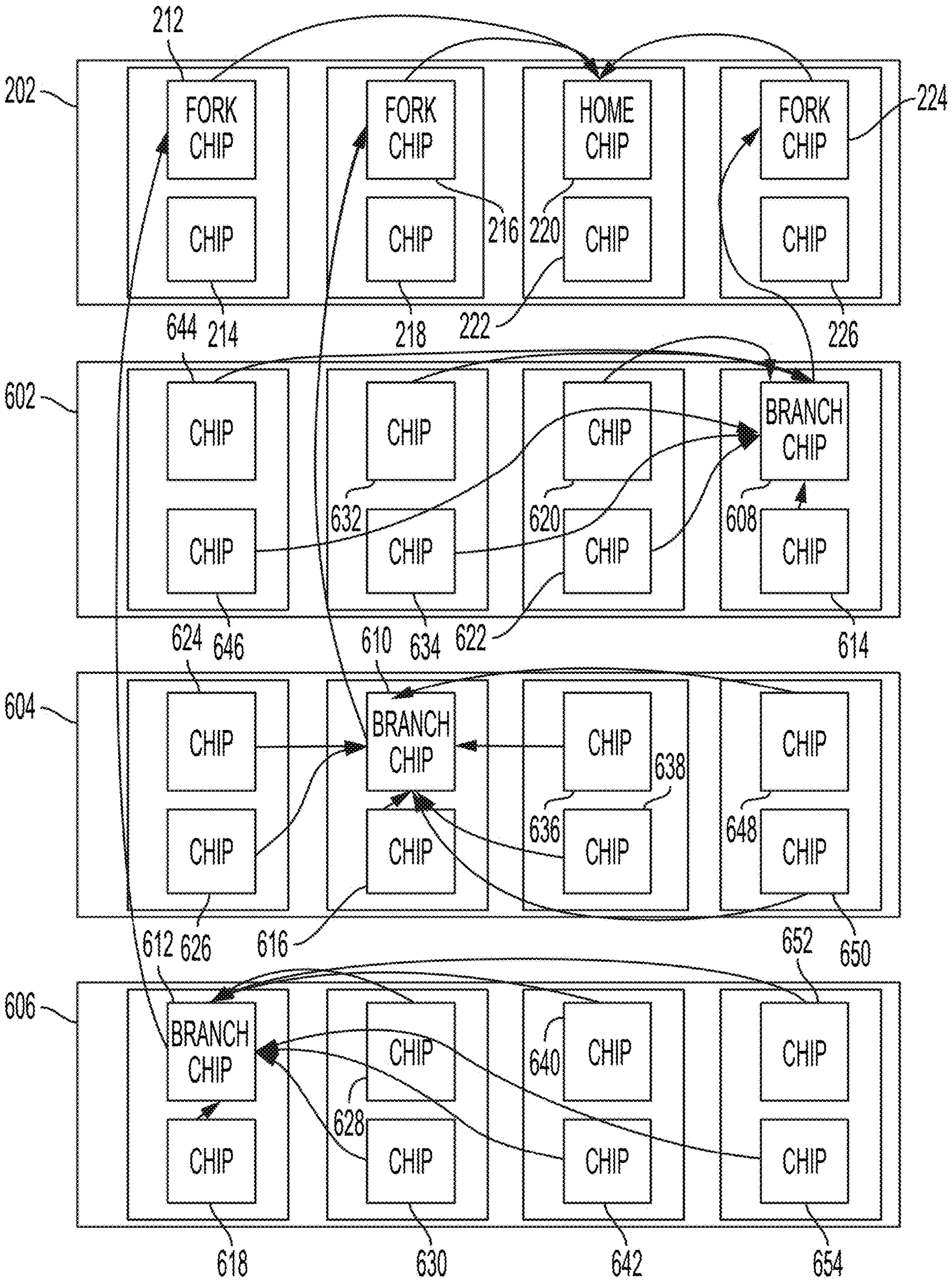
FIG. 8 is a diagram illustrating a global partial message flow in some embodiments.

FIG. 8 is a diagram illustrating a global partial message flow in some embodiments. Continuing with the example described with reference to FIG. 7, on each remote drawers 602, 604, 606, a branch chip 608, 610, 612 collects or receives all partial messages (e.g., PRESPs) from all other chips on the respective drawer. Each of the branch chips combines partial messages received from other chips on the same drawer as the branch chip, and sends the combined response (e.g., CRESP) message to remote chips (other chips) on remote drawer (same drawer as the branch chip). The branch chip sends partial response back to home drawer fork chips, i.e., back to a fork chip on the home drawer, from which the branch chip received a broadcast for cache line search. This partial response is based on the remote drawer combined response that is sent from branch chip to remote chips on remote drawer. For example, after a branch chip 608 collects all partial messages (e.g., PRESPs) from other chips on the remote drawer 602 (same drawer as the branch chip 608), the branch chip 608 combines the partial messages all into a combined response (e.g., CRESP) message and sends that message (CRESP) to its remote chips. The branch chip 608 sends partial response generated based on the CRESP out to the fork chip 224 on the home drawer 202 that sent the broadcast (shown by the arrow lines). Similarly, after a branch chip (e.g., chip 610) collects all partial messages (e.g., PRESPs) from other chips on the remote drawer 604, the branch chip 610 combines the partial messages all into a combined response (e.g., CRESP) message and sends that message (CRESP) to its remote chips. The branch chip 610 sends partial response generated based on the CRESP out to the fork chip 216 on the home drawer that sent the broadcast (shown by the arrow line). Likewise, after a branch chip (e.g., chip 612) collects all partial messages (e.g., PRESPs) from other chips on the remote drawer 606, the branch chip 612 combines the partial messages all into a combined response (e.g., CRESP) message and sends that message (CRESP) to its remote chips. The branch chip 612 sends partial response generated based on the CRESP out to the fork chip 212 on the home drawer that sent the broadcast (shown by the arrow line). The fork chips 212, 216, 224 send the response messages (partial responses received from branch chips) to their home chip 220 (shown by the arrow line). The home chip 220 combines those response messages to a global combined message.

Figure 9:
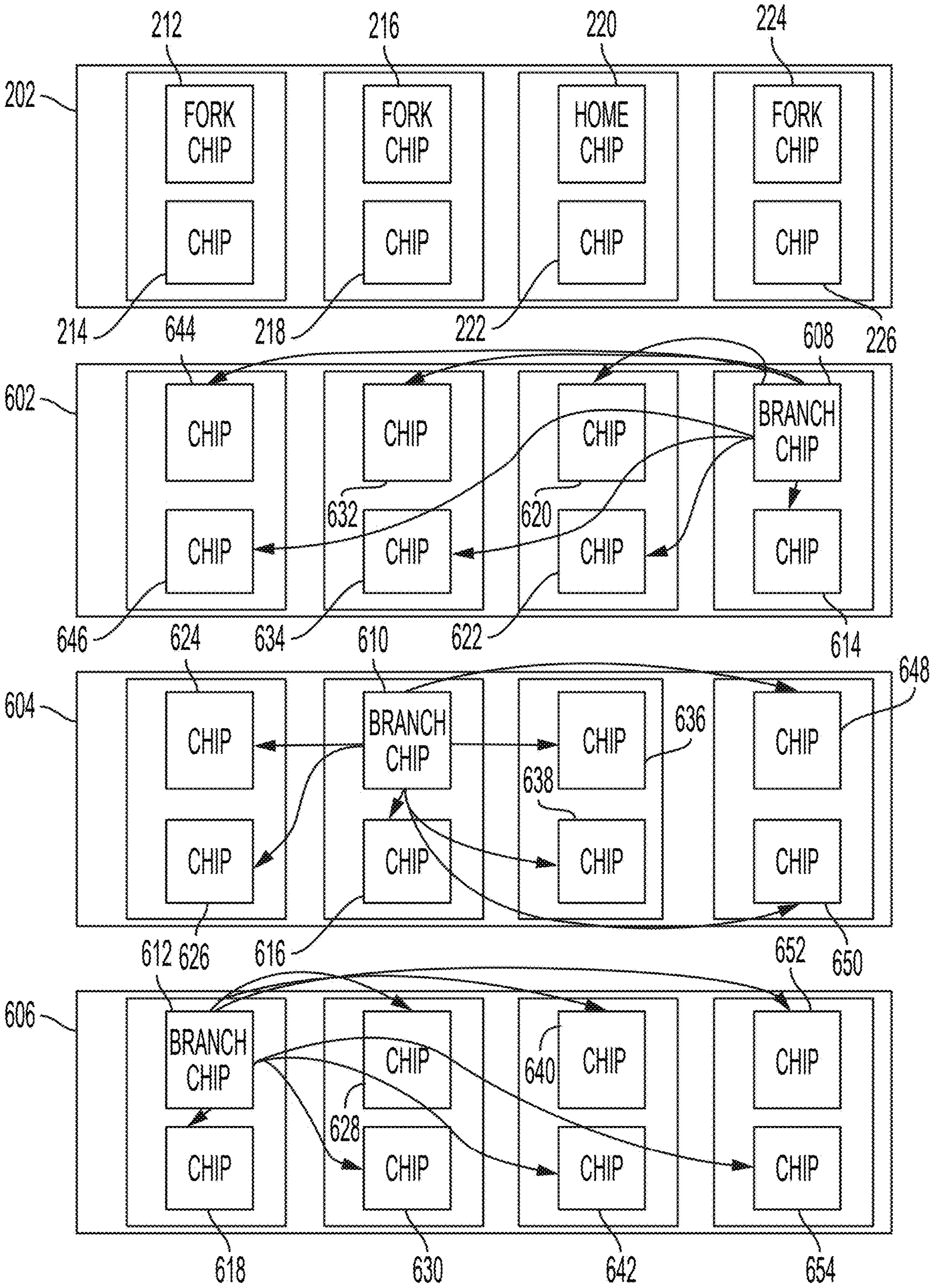
FIG. 9 is a diagram illustrating a remote drawer scope combined message flow on remote drawers in some embodiments.

FIG. 9 is a diagram illustrating a remote drawer scope combined message flow on remote drawers in some embodiments. Each of the remote drawers 602, 604, 606 behave and operate similarly to the operations described with reference to FIG. 4 and home drawer 202. For example, after a branch chip 608 collects all partial messages from other chips on its drawer 602, the branch chip 608 combines them all into a combined response (e.g., CRESP) message and sends that message out to all still participating chips on the same drawer 602, as shown by arrow lines. The cresp provides information for how to proceed for controllers that may have work that needs to be done and have not retired. Examples of this "work that needs to be done" may include, but are not limited to, invalidating copies of a cache line, reading copies of a cache line, changing the directory state of that cache line, communicating with facilities on the chip about the operation. Generally, the cresp is advancing the operation or terminating the operation, similar to what was happening on drawer, in this system wide scenario. Branch chips 610, 612 on drawers 604, 606 operate similarly, as shown by arrow lines.

Figure 10:
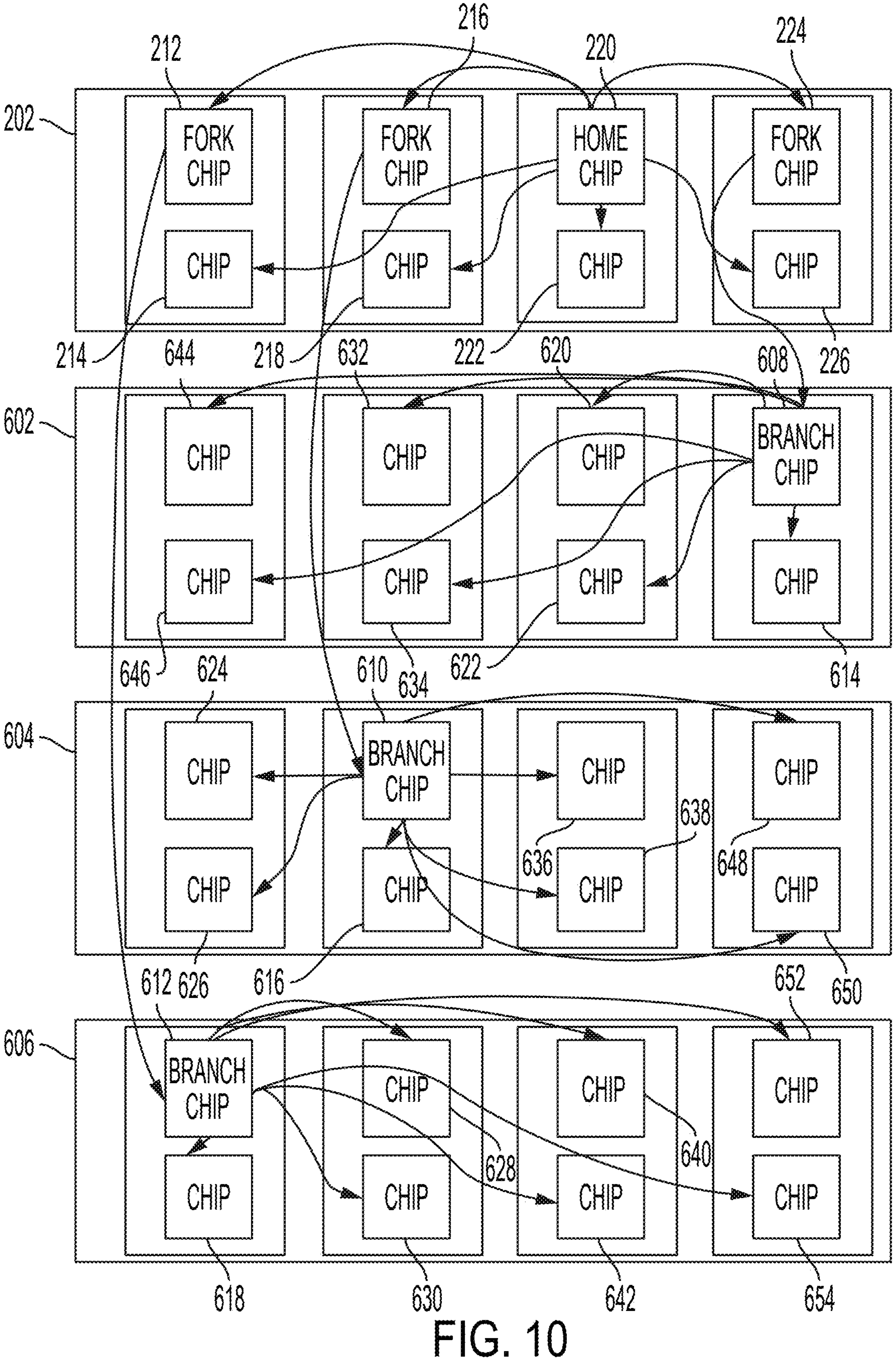
FIG. 10 is a diagram illustrating a global scope combined message flow on remote drawer chips in some embodiments.

FIG. 10 is a diagram illustrating global scope combined message flow on remote drawer chips in some embodiments. A home chip 220 broadcasts or sends a global combined response (e.g., as in FIG. 8) to its fork chips 212, 216, 224; Fork chips 212, 216, 224 in turn send the global combined response to remote branch chips 612, 608, 610. Remote branch chips 612, 608, 610 send the global combined response to their other chips that are participating in the broadcast (e.g., whose remote controller have not retired). In this example, all chips are participating, and therefore, cresp is sent to all chips on all drawers, via the paths of respective fork chips and branch chips. In performing an address broadcast, the search for a highest coherent state may result with a success indicated on the global response message. In that case the coherency resolves, and all controllers finish the operation successfully. For example, this scenario where all remote controllers are returning final response upon CRESP arrival is described with reference to FIG. 11.

In performing an address broadcast, the search for a highest coherent state may result with a rejection on the combined response (e.g., drawer's combined message example shown in FIG. 6). In some cases, the rejection is not sufficient, and the operation proceeds to engage the TM and operate in the global scope. However, with others a rejection results in the operation getting halted at that point. For example, in a case where a reject is from a winner of the highest coherent state, one cannot proceed, and therefore, that reject case does result in the operation getting halted. All remote controllers indicate a final response message back to the home controller and the remote controllers retire. Then the operation or sequence restarts, as in FIG. 2, in which the home chip's local controller restarts from the beginning and initiates a drawer broadcast.

Additionally, if the operation proceeds to the global scope and then ends in a reject on the global combined response (CRESP) message, a similar mechanism occurs. All remote controllers indicate a final response message back to the home chip's local controller and then retire. Then the operation or sequence restarts as in FIG. 2, with the home chip's local controller initiating another broadcast.

Figure 11:
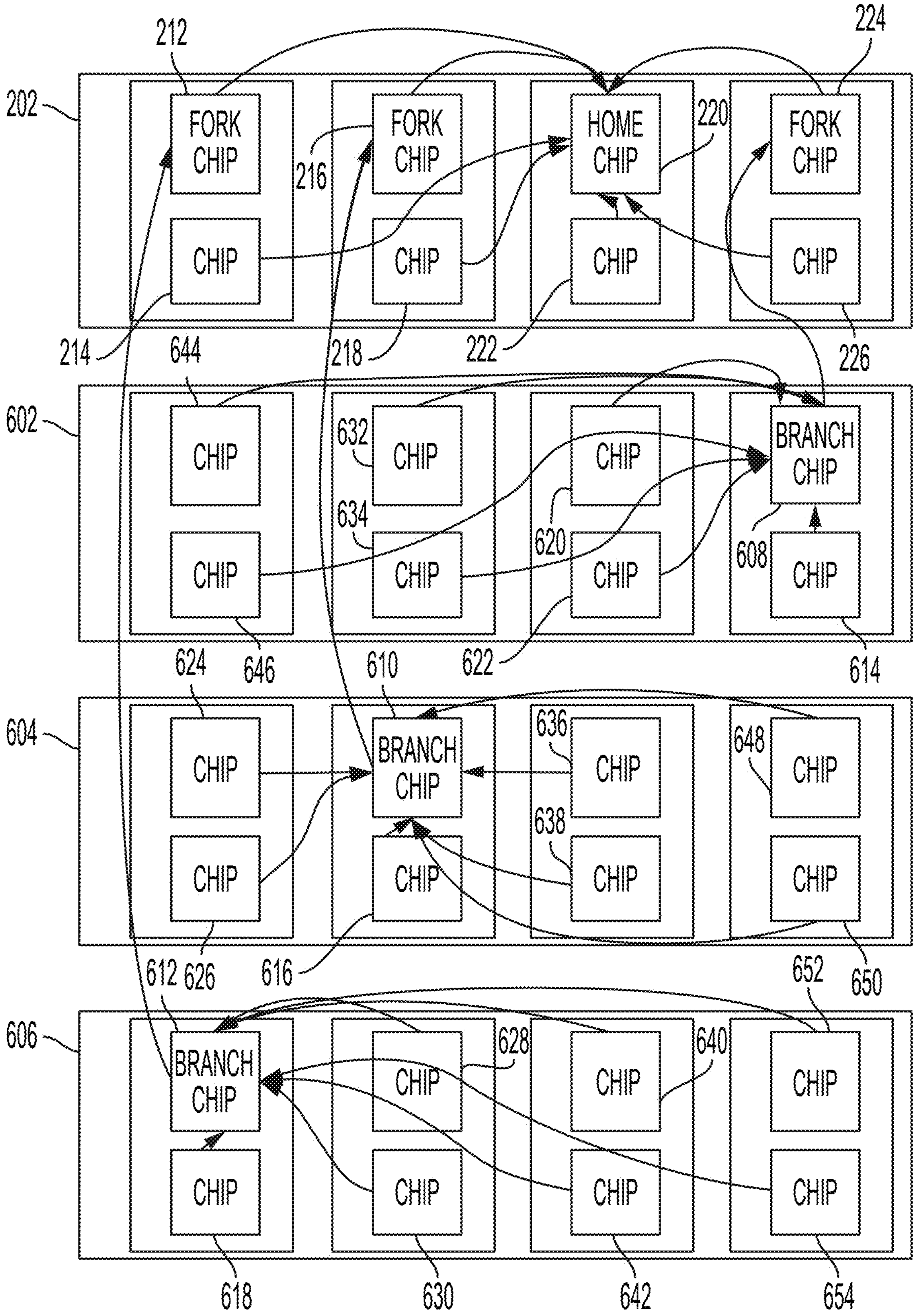
FIG. 11 is a diagram illustrating a final response message flow when an off-drawer broadcast is required in some embodiments.

FIG. 11 is a diagram illustrating final response message flow in a broadcast sequence where an off-drawer broadcast is performed in some embodiments. All chips 212, 214, 216, 218, 222, 224, 226 on home drawer 202 return final response message to home chip 220 as shown by arrow lines. Final message is a message from remote controllers that they have completed with the operation and they can reset. All chips in each of the remote drawers return final response message to respective branch chips. The branch chips in turn send final response message to respective fork chips on home drawer. For instance, on drawer 602, all chips 614, 620, 622, 632, 634, 644, 646 return final response message to branch chip 608. This branch chip 608 returns final response message to fork chip 224 on home drawer 202 to which it is connected. Fork chip 224 then returns this final message to home chip 220. Similarly, on drawer 604, all chips 616, 624, 626, 636, 638, 648, 650 return final response message to branch chip 610. This branch chip 610 returns final response message to fork chip 216 on home drawer 202 to which it is connected. Fork chip 216 then returns this final message to home chip 220. Likewise, on drawer 606, all chips 618, 628, 630, 640, 642, 652, 654 return final response message to branch chip 610. This branch chip 610 returns final response message to fork chip 212 on home drawer 202 to which it is connected. Fork chip 212 then returns this final message to home chip 220.

FIG. 12 is a diagram that illustrates a change of flow in combined response flow at home drawer in some embodiments. FIG. 12 shows cresp flow to chips on home drawer that did not return resource credit on partial response. This change of flow modifies the behavior of a remote controller. Responsive to the home drawer address broadcast resulting in a reject scenario where the operation cannot proceed, instead of all controllers indicating a final response and retiring, the combined response (e.g., CRESP) message is instead sent to all chips on the drawer that are participating (e.g., did not return resource credit and retired). In some embodiments, so that the controllers on chips can receive the combined response, in some embodiments, all controllers can be required to wait for the cresp before retirement. In some other embodiments, a controller can re-broadcast to the chips that had their remote controllers retire using a broadcast snoop. At this point, the operation or sequence resumes according to the flow described with reference to FIG. 3, with the remote controllers on those chips 212, 214, 216, 218, 222, 224, 226 all independently restarting as if they had received a new address broadcast (e.g., as in FIG. 2) and incorporate the combined response (e.g., CRESP) status into their rebroadcast, generate a new partial (e.g., PRESP) message and resume the operation. In some embodiments, the CRESP status indicates what point of coherency was reached by the previous sequence so that a controller start a new sequence at that point. Additionally, a controller may indicate the number of times a chip retried, or any other information, which may be useful from the previous try. This change in the flow saves the step in the operation of initial broadcast (e.g., from the home chip, described with reference to FIG. 2) from having to be done again when restarting an operation after encountering a reject state. With this change in flow, all remote controllers on chips 212, 214, 216, 218, 222, 224, 226 instead re-load themselves responsive to the drawer combined response (CRESP) message, retaining or remembering all information from the original broadcast.

Figure 13:
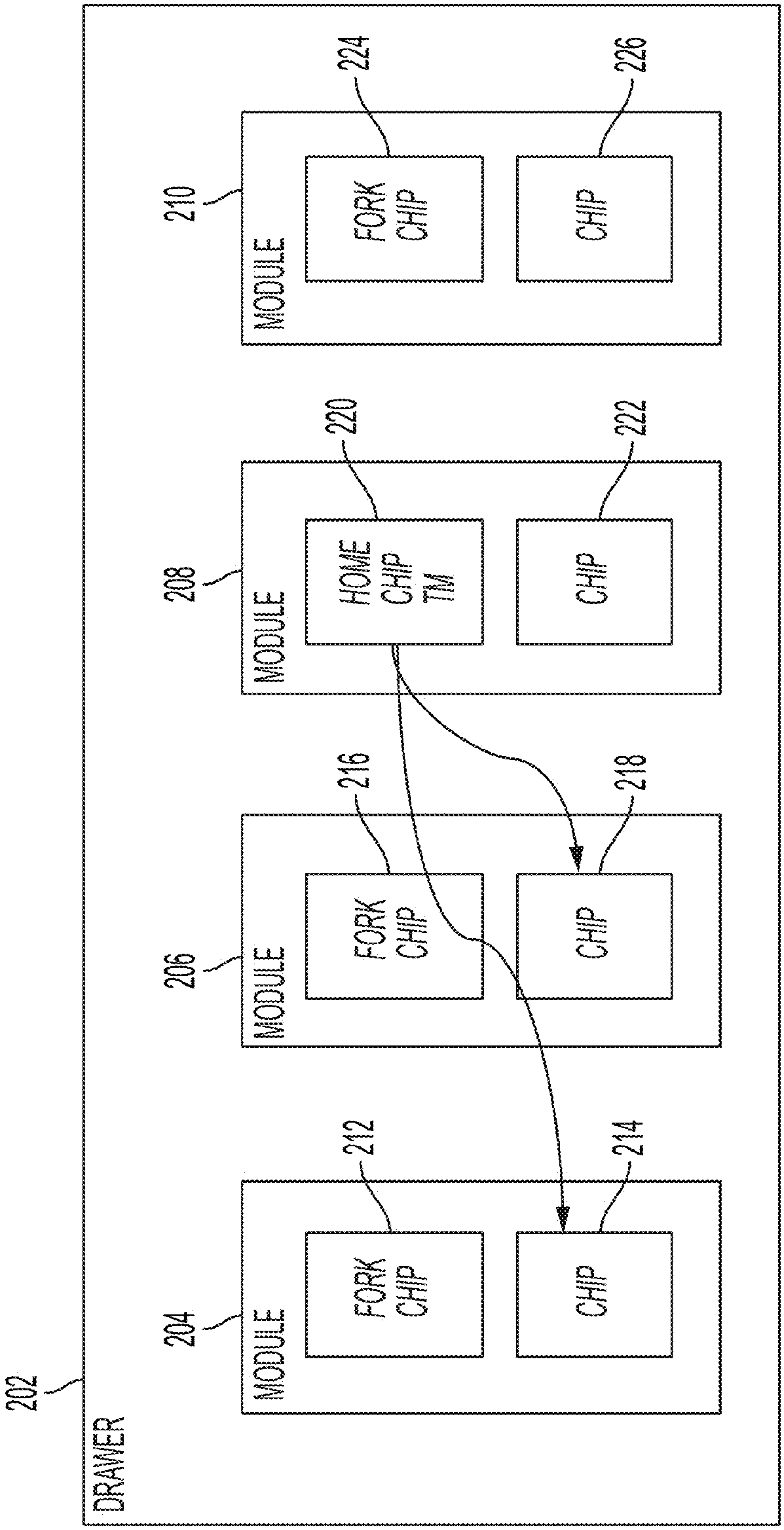
FIG. 13 is a diagram that shows in some embodiments an address rebroadcast sent to the home drawer's chips that returned resource credit, where combined response indicates that rebroadcast is needed.

FIG. 13 is a diagram that shows in some embodiments an address rebroadcast sent to a home drawer's remote chips that returned resource credit, where combined response indicates that rebroadcast is needed. In this example, chips 214, 218 returned resource credit on their partial response. Home chip 220 sends address rebroadcasts to chips 214, 218.

Figure 14:
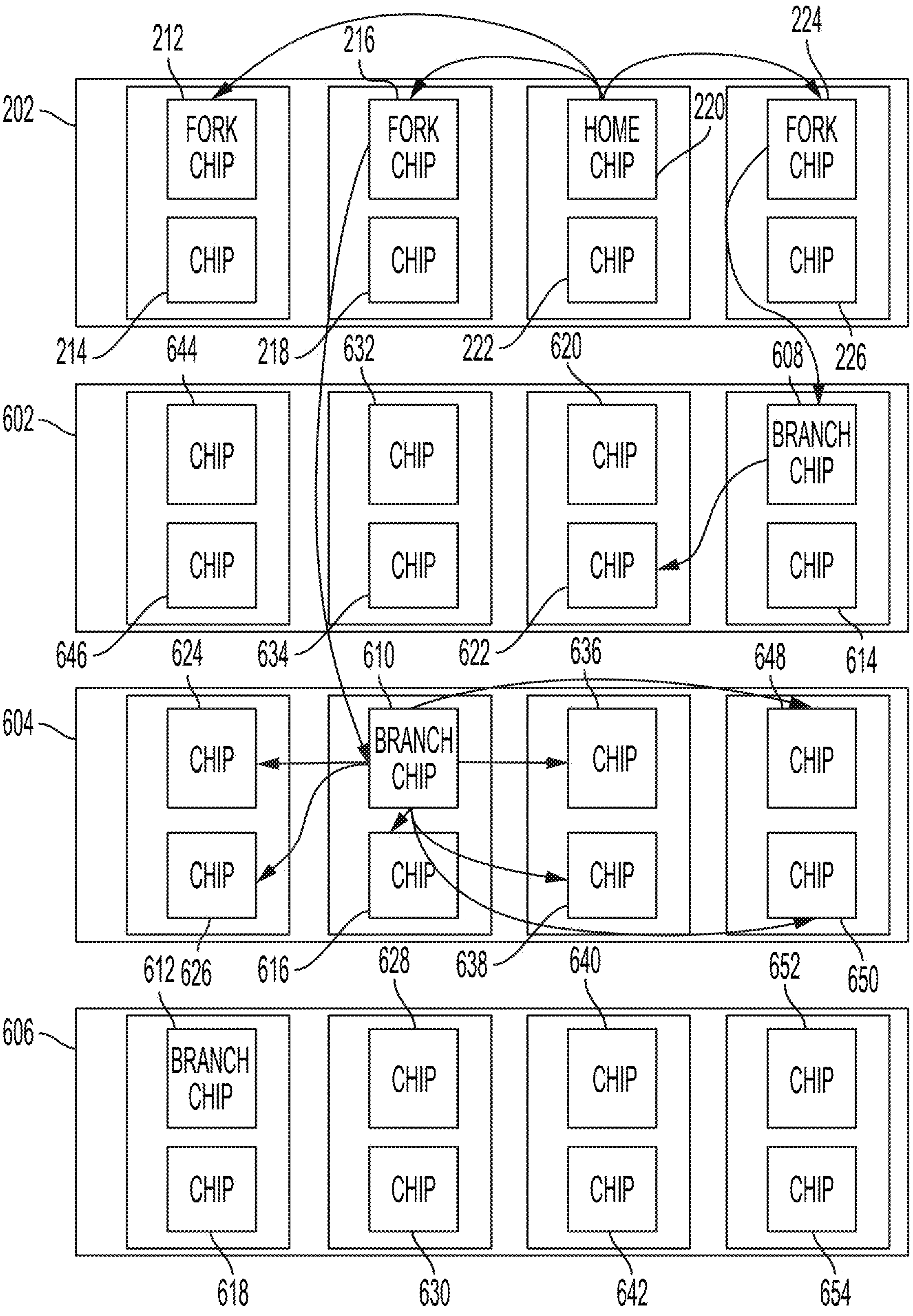
FIG. 14 is a diagram that illustrates a combined response flow at global scope to drawers and chips that did not return resource credit on partial response in some embodiments.

FIG. 14 is a diagram that illustrates a change of flow in combined response flow at global scope in some embodiments. This figure shows combined response (CRESP) flow to chips on remote drawer that did not return resource credit on their partial responses (PRESP). The remote controllers that returned resource credit on PRESP do not receive the Global CRESP. They are reloaded via address rebroadcast. FIG. 14 shows an example scenario where chips 644, 646, 632, 634, 620, 614, 612, 618, 628, 630, 640, 642, 652 and 654 returned resource credit on global PRESP so they are not receiving global CRESP.

Figure 15:
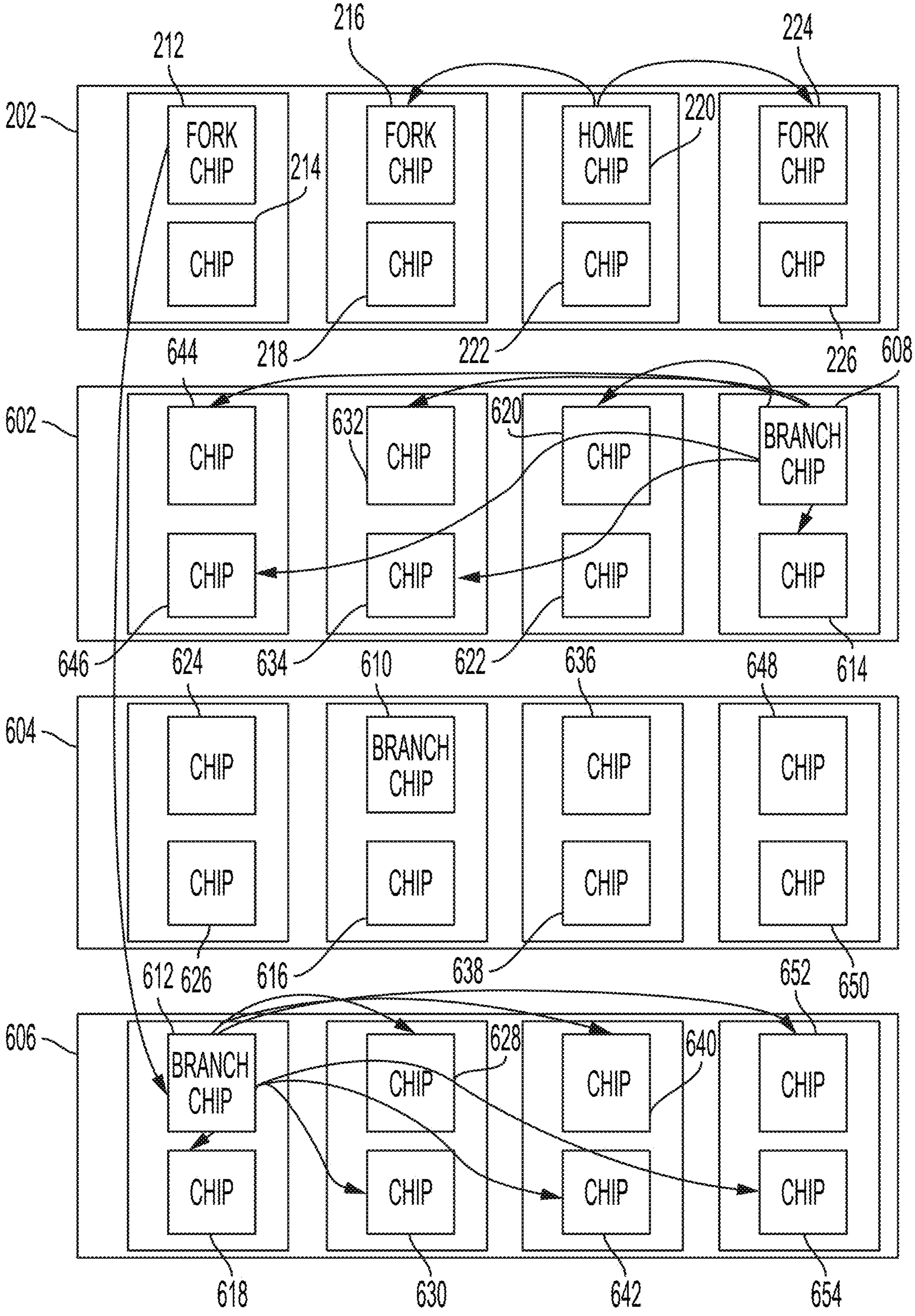
FIG. 15 is a diagram that shows in some embodiments an address rebroadcast sent to the remote drawer chips that returned resource credit, where combined response indicates that rebroadcast is needed.

FIG. 15 is a diagram that shows in some embodiments an address rebroadcast sent to remote drawer chips that returned resource credit, where a combined response indicates rebroadcast is needed. In this example, home chip 220 sends an address rebroadcast to fork chips 216, 224. Fork chip 216 sends address rebroadcast to branch chip 612 of remote drawer 606, to which fork chip 216 is connected. Branch chip 612 of remote drawer 606 sends address rebroadcast to chips 618, 628, 630, 640, 642, 652, 654. Branch chip 608 sends address rebroadcast to all chips other than chip 622 on its drawer 602. Chip 622 did not return resource credit so it will receive the CRESP as shown in FIG. 14. On drawer 604, branch chip 624 need not send address rebroadcast to the chips on its drawer 604.

In some embodiments, if the operation continues to reject and is looping too long (e.g., exceeding a threshold number of loops or exceeding a threshold duration of time, which can be configured or pre-configured), and is not getting resolved after the drawer scope or the global scope after rebroadcasting, one or more of the controllers (e.g., home controller or branch controller) can exit the operation or sequence by indicating on the combined response (e.g., CRESP) message to not retry and not rebroadcast. At this point, the operation or sequence ends and a reject is propagated all the way back to the entity that generated the operation (e.g., home controller).

An address broadcast starts from the home chip. The address broadcast is sent to all the other chips within the drawer, where each chip would look up their caches and find out if they are copies of the line. Each chip also checks whether there is another operation in flight for the same address. Each chip includes such information in a partial response and sends the partial response back to the home chip. A chip can also include a resource credit, an indication that it is done with a given operation and that it is resetting itself. Based on receiving the partial response from each of the chips, the home chip generates a combined response. The home chip sends the combined response to other chips that have not returned resource credit, e.g., including a reset indication. To those that returned resource credit, e.g., including a reset indication, with their partial response, the home chip sends a rebroadcast message. In the following description with reference to FIGS. 16-19, when referring to operations being performed by a chip, it is understood that a controller on that chip (e.g., local to that chip) is performing the operations.

Figure 16:
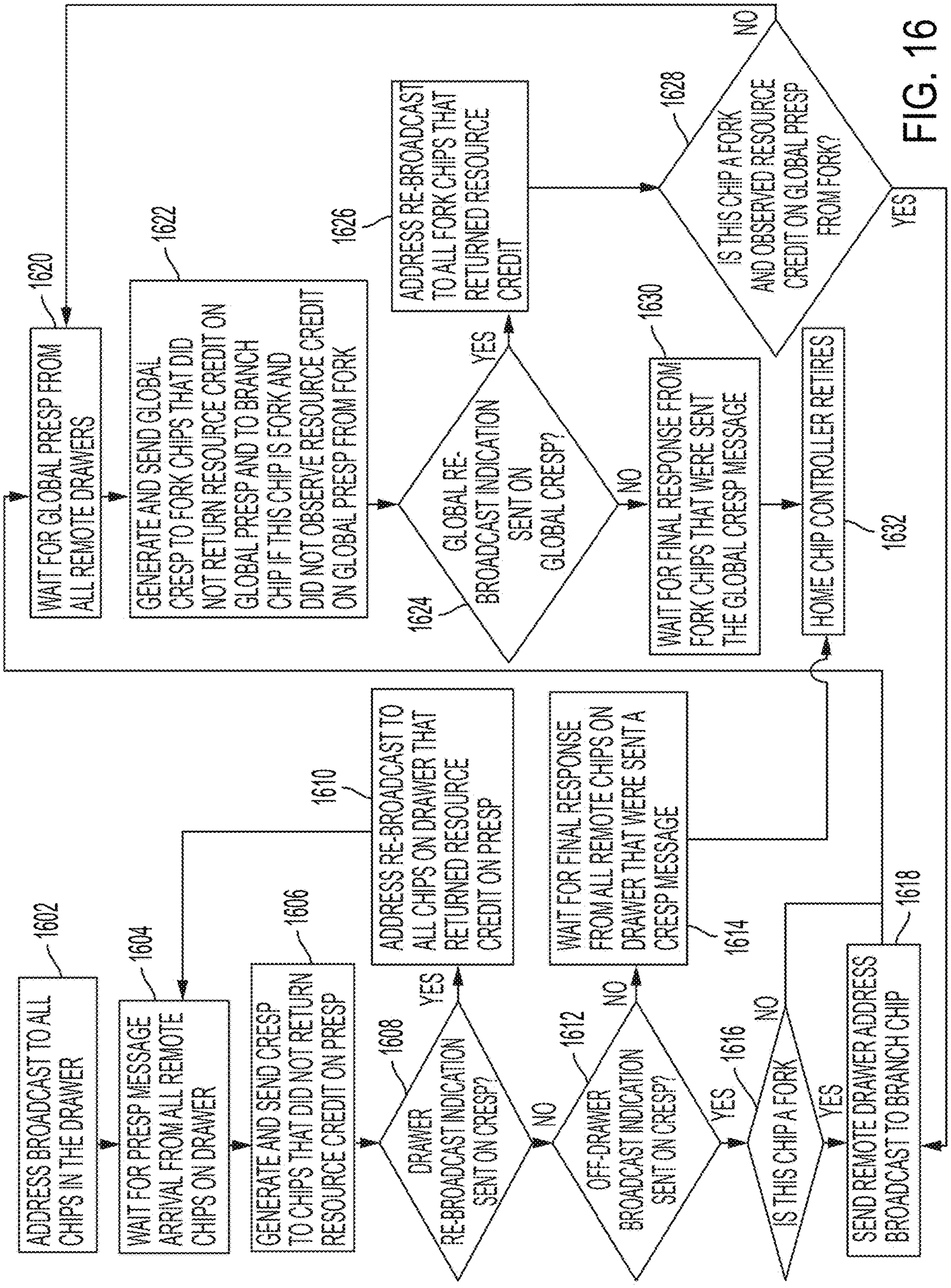
FIG. 16 is a flow diagram illustrating home drawer broadcast in some embodiments.

FIG. 16 is a flow diagram illustrating home drawer broadcast in some embodiments. In some embodiments, this flow shows operations which can be performed by a chip such as a home chip shown at 220 in FIG. 12. At 1602, a controller of a chip on a drawer having multiple chips broadcasts to other chips on the drawer, a message to initiate a search for a cache line among the multiple chips, e.g., an address broadcast. The chip here refers to a home chip, and the drawer refers to a home drawer. The controller can be a local fabric controller loaded on the home chip. Other chips on the drawer are also referred to above as remote chips.

At 1604, the chip waits for partial responses from all other chips on the home drawer. The controller of the chip receives partial responses that indicate status of the search on the other chips on the drawer. For example, each of the other chips on the home drawer sends partial response to the home chip, which the home chip receives.

At 1606, the controller of the chip generates a combined response based on the partial responses received from the other chips. The controller of the chip also sends the combined response to the other chips on the drawer that did not return a reset indication with the status. For example, a partial response may include a resource credit with an indication that the chip that sent that partial response has reset or retired (e.g., a reset indication). In some embodiment there can be a separate entity outside the controller that can collect the partial responses, generate the combined response and send it to local controller and to other chips.

At 1608, the controller of the chip determines whether a rebroadcast is needed, and if so, sends a rebroadcast indication the combined response. As described above, a rebroadcast may be needed if one or more partial responses indicated a reject condition. If a rebroadcast is needed, at 1610, the controller of the chip rebroadcasts the message selectively to only the other chips on the drawer that returned the reset indication with the status. For example, those chips returned a resource credit with an indication that those chips have reset.

At 1612, the controller of the chip determines whether an off-drawer broadcast indication is sent on the combined response. Off-drawer broadcast indication suggests that the search should also be done on chips that are on another drawer (e.g., referred to above as a remote drawer).

At 1614, if no off-drawer broadcast indication is sent on the combined response, at 1616, the controller of the chip waits for final response from the other chips (remote chips) on the drawer (home drawer). At 1632, the controller of the chip (home chip) retires.

If off-drawer broadcast indication is sent on the combined response, at 1616, it is determined whether the chip is a fork chip, a designated chip for communicating with the remote drawer. For example, a home chip may also act as a fork chip.

If the chip (home chip) is also acting as a fork chip, at 1618, the chip sends the address broadcast to a branch chip on that remote drawer.

At 1620, the chip waits for global partial responses from all remote drawers. Here partial responses are global in the sense that partial responses are received from remote drawers too. Global partial responses, e.g., indicate global status of the search on that another drawer's chips. Here, status of the search is referred to as global status in the sense that the status includes status of remote chips on remote drawers.

Responsive to receiving the global partial responses that indicate global status of the search on one or more remote drawer's chips, the controller of the chip generates a global combined response based on the global partial responses.

The controller of the chip also causes sending of the global combined response to one or more remote drawer's chips that did not return a reset indication with the global status. In some embodiment there is a separate entity outside the controller that can collect the partial responses, generate the combined response and send it to local controller and to other chips. For example, in some embodiments, as shown at 1622, the chip (home chip) generates and sends a global combined response to all chips that did not return resource credit (e.g., which indicates reset) on global partial responses including one or more fork chips. If this chip is also operating as a fork chip, the chip also sends the global combined response to a branch chip (on a remote drawer with which it is connected) that did not observe resource credit on global partial responses. The branch chip would then send the global combined response to its drawer chips that did not return resource credit in their respective global partial responses.

The controller of the chip (home chip) also causes rebroadcasting selectively of the message to only remote drawer's chips that returned the reset indication with the global status. For example, at 1624, if the controller of the chip determines that global rebroadcast indication is sent on global combined response, at 1626, the controller of the chip (home chip) rebroadcasts the message (address rebroadcast) to all fork chips that returned a reset indication, e.g., resource credit with reset indication. The fork chips in turn would send the rebroadcast to respective branch chips, which would then send the rebroadcast to respective remote drawer chips that returned reset indication. At 1628, if this chip (home chip) is also acting as a fork chip, this fork chip sends the processing proceeds to 1618 where the address broadcast is sent (this time rebroadcast). If this chip is not operating as a fork chip, the processing proceeds to 1620, waiting for global partial response from all remote chips.

If at 1624, if the controller of the chip determined that no global rebroadcast indication is sent on global combined response (and therefore, no global rebroadcast is needed), at 1630, the chip (home chip) waits for final response from one or more fork chips that were sent the global combined message. Responsive to receiving the final response, at 1632, the home chip controller retires.

Figure 17A:
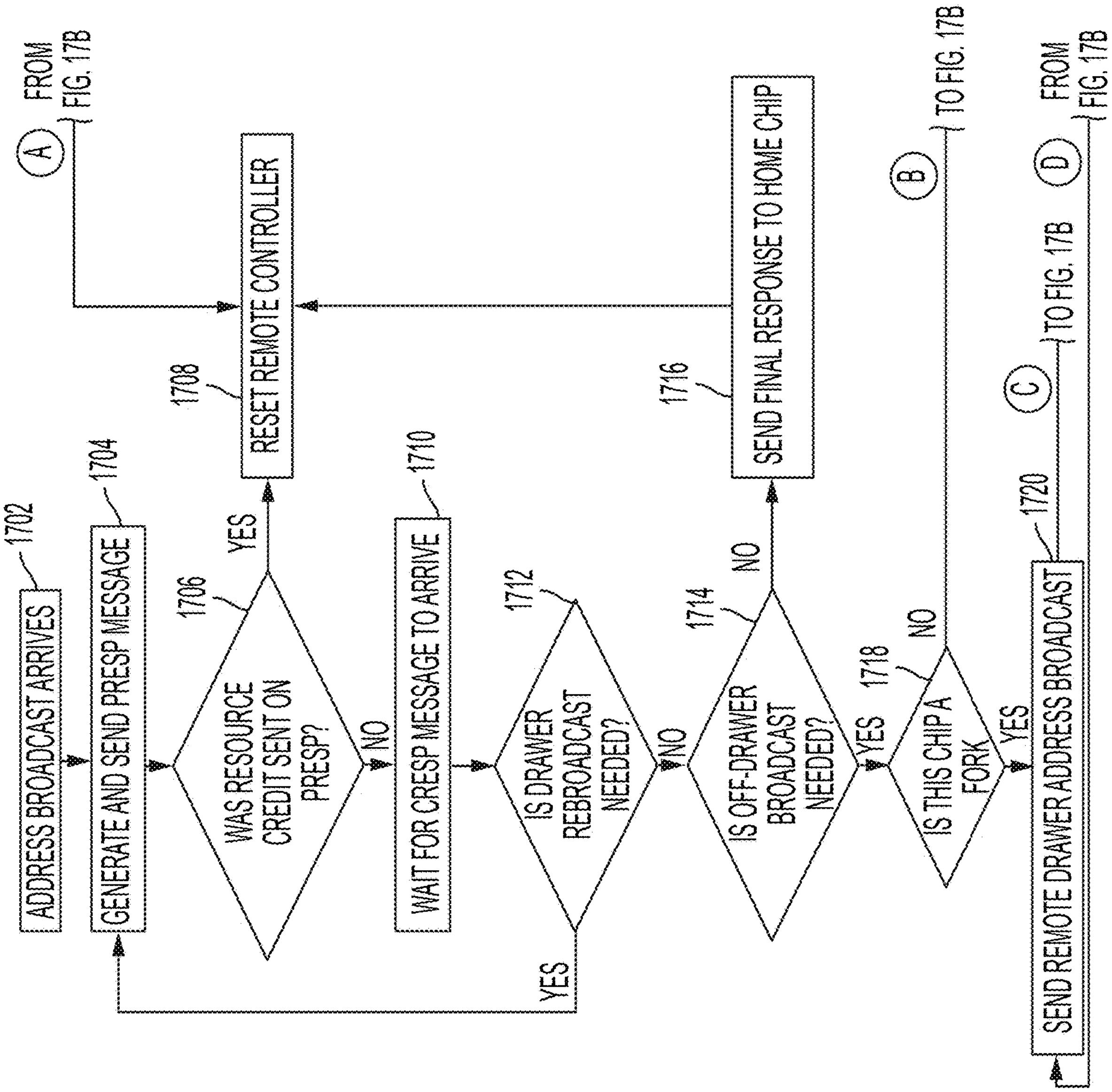
FIGS. 17A-17B is a flow diagram showing a home drawer remote chip broadcast flow in some embodiments.
Figure 17B:
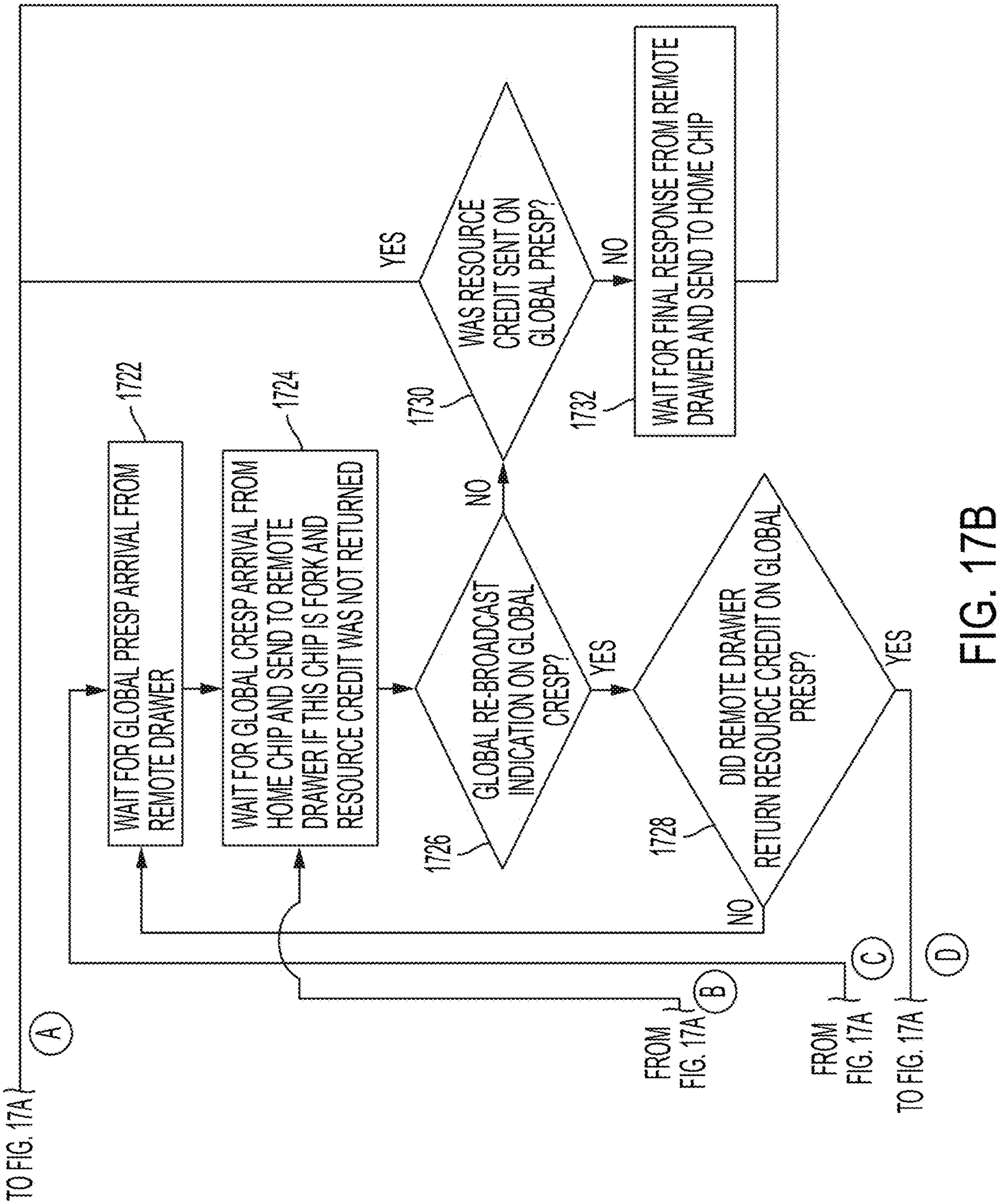

FIGS. 17A-17B is a flow diagram showing a home drawer remote chip broadcast flow in some embodiments. In the home drawer remote chip broadcast flow in some embodiments, a chip (e.g., referred to above as remote chip) on a drawer having multiple chips (e.g., referred to as home drawer) receives a broadcast of a message to initiate a search for a cache line on the chip (e.g., referred to also as an address broadcast), the message being broadcast from another chip (e.g., referred to as above as home chip) on the drawer. The chip generates a partial response indicating status of the search on the chip. The chip sends the partial response and if it has not retired or reset, receives a combined response that includes combined statuses of the search performed on the multiple chips. Based on determining that the combined response includes a rebroadcast indication, the chip performs a retry for the search without having to receive a rebroadcast of the message from the home chip.

Referring to FIGS. 17A-17B, at 1702, address broadcast arrives. At 1704, the chip generates and sends a partial response. In some embodiments, this flow shows operations which can be performed by a chip such as one or more remote chips shown in FIG. 12. At 1706, if resource credit was sent with partial response (PRESP), a reset indication, the controller of this chip (e.g., referred to as remote controller) resets or retires at 1708. If no resource credit was sent, at 1710, the chip waits for combined response (CRESP) to arrive, and receives CRESP when it arrives. At 1712, if the combined response includes a rebroadcast indication, the chip performs a retry for the search, at 1704, where the partial response is generated again and sent. In this way, for example, no additional rebroadcast needs to be received at this chip to initiate a retry. Rather, based on the CRESP, the chip would automatically perform a retry.

If at 1712, no rebroadcast is needed (CRESP does not include rebroadcast indication), and no Off-Drawer Broadcast is needed at 1714, the chip sends final response at 1716, and the controller of this chip (e.g., referred to as remote controller) resets or retires at 1708.

If the chip is a fork chip, based on the combined response indicating that the message is to be broadcast to another drawer's chips on another drawer (referred to as remote drawer), causes sending of the message to those another drawer's chips on that another drawer. The message to broadcast (referred to as address broadcast) is to initiate the search for the cache line among those another drawer's chips. For instance, at 1718, if the chip is a fork chip, e.g., having connection or interface to a remote chip (e.g., branch chip) on remote drawer, at 1720, the chip sends the address broadcast to the remote chip (e.g., branch chip) on the remote drawer. Then at 1722, the chip that is also a fork chip waits for global partial response arrival from remote drawer. The fork chip sends or forwards the global partial responses from remote drawer to the home chip.

At 1724, the chip waits for global combined response to arrive from home chip. If this chip is also a fork chip, then the fork chip sends this global combined response that arrives to remote drawer if a reset indication was not returned.

At 1726, if the global combined response indicates that rebroadcast is needed, and at 1728, if the remote drawer returned a reset indication, then a rebroadcast should be sent to the remote drawer. Hence, at 1718, if the chip is a fork chip, at 1720, the chip sends the address broadcast (rebroadcast this time), and the processing proceeds to 1722, waiting for global partial responses. For example, the chip causes rebroadcasting selectively of the message to only that another drawer's chips that returned the reset indication with the global status.

Referring back to 1728, if the remote drawer did not return a reset indication, the processing proceeds to 1722, where the chip waits for global partial response arrival. For example, in this scenario, the remote drawer's chips would separately perform a retry based on the combined response message indicating a rebroadcast, without a rebroadcast having to sent to it. Therefore, the chip wait at 1722.

Referring back to 1726, if the global combined response does not include rebroadcast indication, at 1730, if a reset indication (e.g., with resource credit) was sent on global partial response from this chip, then at 1708, the chip's controller is reset. If no reset indication (e.g., with resource credit) was sent on global partial response from this chip, then at 1732, the chip waits for final response from remote drawer and the final response is sent to home chip.

Figure 18:
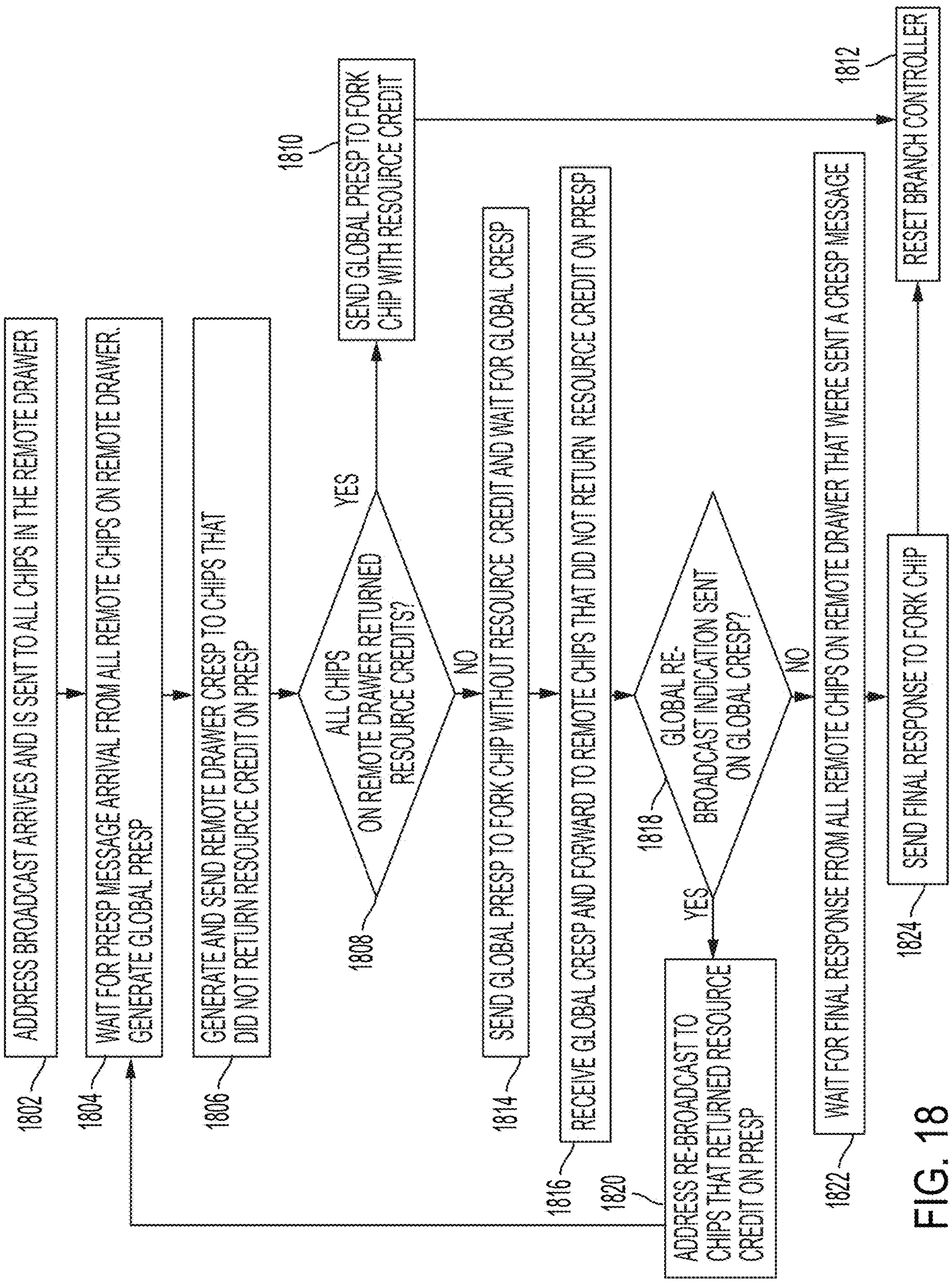
FIG. 18 is a flow diagram illustrating a remote drawer branch chip broadcast flow in some embodiments.

FIG. 18 is a flow diagram illustrating a remote drawer branch chip broadcast flow in some embodiments. In some embodiments, this flow shows operations which could be performed by a chip such as a branch chip shown at 608 in FIG. 14. At 1802, address broadcast arrives and is sent to all chips in the remote drawer. For example, a branch chip receives address broadcast from home drawer's fork chip, and sends that address broadcast to all other chips in the branch chip's drawer (referred to as remote drawer).

At 1804, the branch chip waits for partial response arrival from all remote chips on remote drawer (branch chip's drawer), and receives the partial responses. The branch chip generates global partial response based on the partial responses from all chips on the drawer it is located. This includes its (branch chip's) own partial response not just the partial responses that arrived from the other chips.

At 1806, the branch chip generates a combined response based on the partial responses, and sends the combined response to the remote chips on its drawer (remote drawer).

At 1808, if all chips on remote drawer returned resource credits, which indicates reset, at 1810, the branch chip sends a global partial response to the home drawer's fork chip with resource credit, which includes reset indication. At 1812, the branch chip's controller is resets.

At 1808, if all chips on remote drawer did not return resource credits (indication reset), at 1814, the branch chip sends the global partial response without resource credit (no reset indication) to the home drawer's fork chip. The branch chip waits for a global combined response to arrive.

At 1816, the branch chip receives a global combined response and forwards the global combined response to one or more remote chips (on branch chip's drawer) that did not return resource credit (which includes reset indication) on their respective partial responses.

At 1818, if global rebroadcast indication is sent on the global combined response, at 1820, address re-broadcast is sent to one or more remote chips (on branch chip's drawer) that returned resource credit (which indicates reset) on their respective partial responses.

At 1818, if no global rebroadcast indication is sent on the global combined response, at 1822, the branch chip waits for final response from all remote chips on branch chip's drawer (remote drawer) that were sent a combined response.

At 1824, the branch chip receives final responses from the remote chips and sends the final responses to a fork chip on home drawer, to which it is connected. At 1812, the branch chip's controller is resets.

Figure 19:
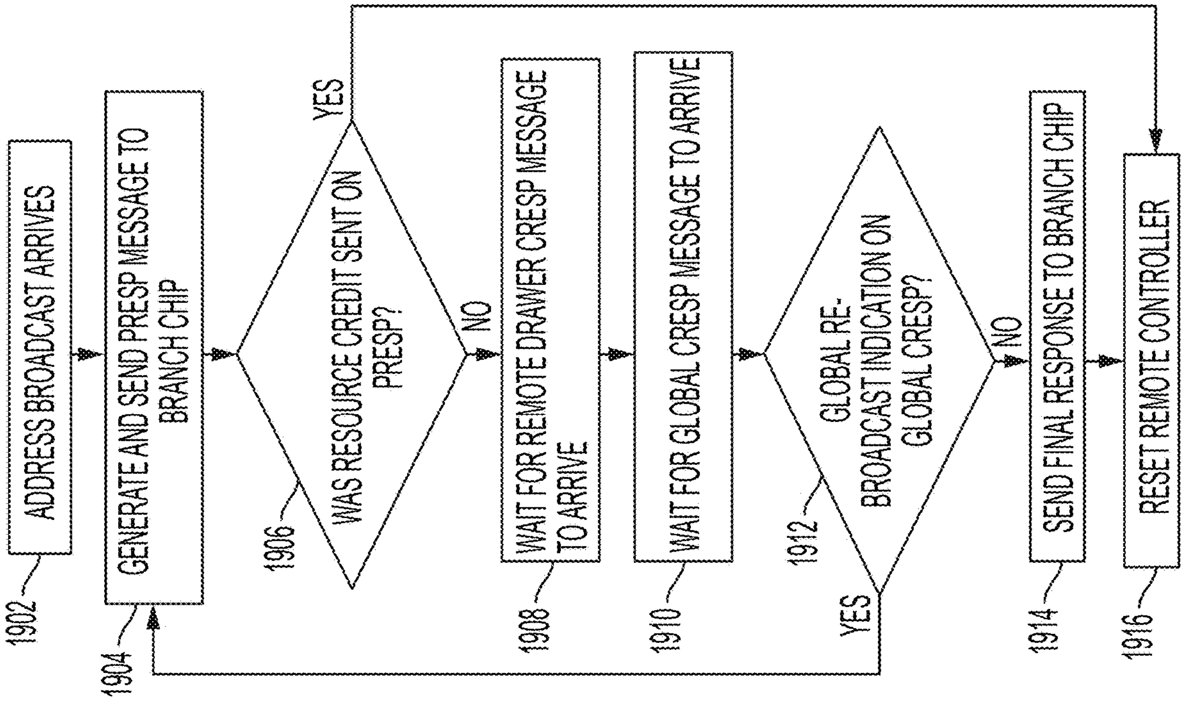
FIG. 19 is a flow diagram illustrating a remote drawer remote chip broadcast flow in some embodiments.

FIG. 19 is a flow diagram illustrating a remote drawer remote chip broadcast flow in some embodiments. In some embodiments, this flow shows operations which could be performed by a chip such as a remote chip shown at 622, and a remote chip shown at 620 in FIG. 14. At 1902, address broadcast arrives. For example, a remote chip on a remote drawer receives an address broadcast, e.g., via a branch chip. At 1904, the remote chip generates a partial response and sends the partial response to its branch chip.

If at 1906, a reset indication (e.g., by way of resource credit) was sent on the partial response, the remote chip's controller resets at 1916.

If at 1906, no reset indication was sent on the partial response, the remote chip waits remote drawer combined response to arrive at 1908. At 1910, the remote chip waits for global combined response to arrive.

The remote chip receives a global combined response. At 1912, if the global rebroadcast indication is present in the global combined response, the processing proceeds to 1904, where the remote chip separately performs a retry of the search, and generates and sends partial response to the branch chip.

At 1912, if no rebroadcast indication is sent in the global combined response, at 1914, the remote chip sends a final response to the branch chip. At 1916, the remote chip's controller is reset.

Briefly, as discussed above resource credit is an indication that a chip is done with its operations and its controller is reset, the chip's controller has retired. A speculative resource credit is an indication that a chip is done with its operations, and the chip's controller is ready to reset, but has not yet reset or retired. Some chips when returning a partial message may indicate their completion of operations with resource credits or speculative resource credit, based on which protocols they are configured to use.

FIGS. 16-19 illustrated flow of the chips'operations in various roles (e.g., home chip, fork chip, remote chip, branch chip, branch chip's remote chip) in connection with chips using protocols that return non-speculative resource credits, when the chips are completed with their operations. The terms CRESP and CRESP message are used interchangeably. PRESP and PRESP message are used interchangeably.

The techniques described herein also can work with chips that follow protocols involving speculative resource credits. For example, since speculative resource credits do not include a reset indication, a combined response would still be sent to those chips returning speculative resource credits. In some embodiments, for the speculative resource credit protocol, while the resource credits are returned, the controllers do not retire after sending a partial response with the speculative resource credit, and hence combined response is sent to all chips always (where all chips use the speculative resource credit protocol). In some embodiments where chips implement the speculative resource credit protocol, there are no explicit address re-broadcast sent since the combined response would always be received and indicate whether or not the re-broadcast is needed or happening.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
broadcasting, by a controller of a chip on a drawer having multiple chips, to other chips on the drawer, a message to initiate a search for a cache line among the multiple chips, wherein the drawer contains the chip, the controller of the chip, and the other chips on the drawer;
receiving, by the controller of the chip, partial responses that indicate status of the search on the other chips on the drawer;
generating, by the controller of the chip, a combined response based on the partial responses;
sending, by the controller of the chip, the combined response to the other chips on the drawer that did not return a reset indication with the status, the reset indication being an indication that a respective other chip is done with a given operation and that the respective other chip is resetting itself; and
rebroadcasting selectively, by the controller of the chip, the message to only the other chips on the drawer that returned the reset indication with the status, without rebroadcasting to the other chips on the drawer that did not return the reset indication with the status.

2. The method of claim 1, further including:
causing, by the controller of the chip, the message that is broadcast to be sent to another drawer's chips on another drawer to initiate the search for the cache line among said another drawer's chips;
waiting, by the controller of the chip, for global partial responses from said another drawer's chips;
responsive to receiving the global partial responses that indicate global status of the search on said another drawer's chips, generating, by the controller of the chip, a global combined response based on the global partial responses;
causing, by the controller of the chip, sending of the global combined response to said another drawer's chips that did not return a reset indication with the global status; and
causing, by the controller of the chip, rebroadcasting selectively of the message to only said another drawer's chips that returned the reset indication with the global status.

3. The method of claim 2, wherein the controller of the chip communicates with a designated chip on the drawer to cause the message that is broadcasted to be sent to said another drawer's chips on said another drawer, to cause the sending of the global combined response to said another drawer's chips that did not return a reset indication, and to cause the rebroadcasting selectively of the message to only said another drawer's chips that returned the reset indication.

4. The method of claim 3, wherein the controller of the chip receives the global partial responses via the designated chip.

5. The method of claim 2, wherein the causing of the sending of the global combined response to said another drawer's chips that did not return a reset indication with the global status, causes, responsive to the global combined response including a rebroadcast indication, said another drawer's chips that did not return a reset indication with the global status, to separately perform a retry for the search without the controller of the chip having to cause to send a rebroadcast.

6. The method of claim 1, wherein the sending of the combined response causes, responsive to the combined response including a rebroadcast indication, the other chips on the drawer that did not return the reset indication with the status, to separately perform a retry for the search without the controller of the chip having to send a rebroadcast.

7. The method of claim 1, further including:
responsive to the sending of the combined response, waiting, by the controller of the chip, for next partial responses from the other chips on the drawer.

8. The method of claim 1, wherein the rebroadcast of the message to only the other chips on the drawer that returned the reset indication with the status, causes the other chips on the drawer that returned the reset indication with the status to reload and retry the search.

9. A computer program product comprising:
one or more computer-readable storage media, wherein the one or more computer-readable storage media are not transitory signals per se; and
program instructions stored on the one or more non-transitory computer-readable storage media to perform operations comprising:
broadcasting, by a controller of a chip on a drawer having multiple chips, to other chips on the drawer, a message to initiate a search for a cache line among the multiple chips, wherein the drawer contains the chip, the controller of the chip, and the other chips on the drawer;
receiving, by the controller of the chip, partial responses that indicate status of the search on the other chips on the drawer;
generating, by the controller of the chip, a combined response based on the partial responses;
sending, by the controller of the chip, the combined response to the other chips on the drawer that did not return a reset indication with the status, the reset indication being an indication that a respective other chip is done with a given operation and that the respective other chip is resetting itself; and
rebroadcasting selectively, by the controller of the chip, the message to only the other chips on the drawer that returned the reset indication with the status, without rebroadcasting to the other chips on the drawer that did not return the reset indication with the status.

10. The computer program product of claim 9, wherein the operations further include:
causing, by the controller of the chip, the message that is broadcast to be sent to another drawer's chips on another drawer to initiate the search for the cache line among said another drawer's chips;
waiting, by the controller of the chip, for global partial responses from said another drawer's chips;
responsive to receiving the global partial responses that indicate global status of the search on said another drawer's chips, generating, by the controller of the chip, a global combined response based on the global partial responses;
causing, by the controller of the chip, sending of the global combined response to said another drawer's chips that did not return a reset indication with the global status; and
causing, by the controller of the chip, rebroadcasting selectively of the message to only said another drawer's chips that returned the reset indication with the global status.

11. The computer program product of claim 10, wherein the controller of the chip communicates with a designated chip on the drawer to cause the message that is broadcasted to be sent to said another drawer's chips on said another drawer, to cause the sending of the global combined response to said another drawer's chips that did not return a reset indication, and to cause the rebroadcasting selectively of the message to only said another drawer's chips that returned the reset indication.

12. The computer program product of claim 11, wherein the controller of the chip receives the global partial responses via the designated chip.

13. The computer program product of claim 10, wherein the causing of the sending of the global combined response to said another drawer's chips that did not return a reset indication with the global status, causes, responsive to the global combined response including a rebroadcast indication, said another drawer's chips that did not return a reset indication with the global status, to separately perform a retry for the search without the controller of the chip having to cause to send a rebroadcast.

14. The computer program product of claim 9, wherein the sending of the combined response causes, responsive to the combined response including a rebroadcast indication, the other chips on the drawer that did not return the reset indication with the status, to separately perform a retry for the search without the controller of the chip having to send a rebroadcast.

15. The computer program product of claim 9, wherein the operations further include, responsive to the sending of the combined response, waiting, by the controller of the chip, for next partial responses from the other chips on the drawer.

16. The computer program product of claim 9, wherein the rebroadcast of the message to only the other chips on the drawer that returned the reset indication with the status, causes the other chips on the drawer that returned the reset indication with the status to reload and retry the search.

17. A computer system comprising:
- a processor set;
- a set of one or more computer-readable storage media;
- program instructions stored on the one or more computer-readable storage media to cause the processor set to perform operations comprising:
  - causing broadcasting, by a controller of a chip on a drawer having multiple chips, to other chips on the drawer, a message to initiate a search for a cache line among the multiple chips, wherein the drawer contains the chip, the controller of the chip, and the other chips on the drawer;
  - causing receiving, by the controller of the chip, partial responses that indicate status of the search on the other chips on the drawer;
  - causing generating, by the controller of the chip, a combined response based on the partial responses;
  - causing sending, by the controller of the chip, the combined response to the other chips on the drawer that did not return a reset indication with the status, the reset indication being an indication that a respective other chip is done with a given operation and that the respective other chip is resetting itself; and
  - causing rebroadcasting selectively, by the controller of the chip, the message to only the other chips on the drawer that returned the reset indication with the status, without rebroadcasting to the other chips on the drawer that did not return the reset indication with the status.

18. The computer system of claim 17, wherein the sending of the combined response causes, responsive to the combined response including a rebroadcast indication, the other chips on the drawer that did not return the reset indication with the status, to separately perform a retry for the search without the controller of the chip having to send a rebroadcast.

19. The computer system of claim 17, wherein the rebroadcast of the message to only the other chips on the drawer that returned the reset indication with the status, causes the other chips on the drawer that returned the reset indication with the status to reload and retry the search.

20. The computer system of claim 17, wherein the computer operations further:
- causing the message that is broadcast to be sent to another drawer's chips on another drawer to initiate the search for the cache line among said another drawer's chips;
- causing waiting for global partial responses from said another drawer's chips;
- causing, responsive to receiving the global partial responses that indicate global status of the search on said another drawer's chips, generating of a global combined response based on the global partial responses;
- causing sending of the global combined response to said another drawer's chips that did not return a reset indication with the global status; and
- causing rebroadcasting selectively of the message to only said another drawer's chips that returned the reset indication with the global status.

21. A computer-implemented method comprising:
- receiving, by a chip on a drawer having multiple chips, a broadcast of a message to initiate a search for a cache line on the chip, the message being broadcast from another chip on the drawer;
- generating, by the chip, a partial response indicating a status of the search on the chip;
- sending, by the chip, the partial response;
- receiving, by the chip, a combined response that includes combined statuses of the search performed on the multiple chips; and
- based on determining that the combined response includes a rebroadcast indication, performing a retry for the search responsive to receiving the combined response and without having to receive a rebroadcast of the message from said another chip on the drawer.

22. The method of claim 21, further comprising:
- based on the combined response indicating that the message is to be broadcast to another drawer's chips on another drawer, causing, by the chip, sending of the message to said another drawer's chips on said another drawer, the message that is broadcast to initiate the search for the cache line among said another drawer's chips;
- waiting, by the chip, for global partial responses from said another drawer's chips;
- sending, by the chip, the global partial responses to said another chip on the drawer, the global partial responses that indicate global status of the search on said another drawer's chips;
- waiting, by the chip, for a global combined response from said another chip on the drawer;
- causing, by the chip, sending of the global combined response to said another drawer's chips that did not return a reset indication with the global status; and causing, by the chip, rebroadcasting selectively of the message to only said another drawer's chips that returned the reset indication with the global status.

23. The method of claim 22, wherein causing the sending of the global combined response causes, responsive to the global combined response including a rebroadcast indication, said another drawer's chips that did not return reset indication with the global status, to separately perform a retry for the search without having to send a rebroadcast.

24. A system comprising:

a plurality of chips on a drawer;

a controller loaded on a chip of the plurality of chips;

the controller being configured to perform operations comprising:

broadcasting to other chips other than the chip on the drawer, a message to initiate a search for a cache line;

receiving partial responses that indicate status of the search on the other chips on the drawer;

generating a combined response based on the partial responses;

sending the combined response to the other chips on the drawer that did not return a reset indication with the status, the reset indication being an indication that a respective other chip is done with a given operation and that the respective other chip is resetting itself; and rebroadcasting selectively the message to only the other chips on the drawer that returned the reset indication with the status, without rebroadcasting to the other chips on the drawer that did not return the reset indication with the status.

25. The system of claim 24, wherein the sending of the combined response, responsive to the combined response including a rebroadcast indication, causes the other chips on the drawer that did not return the reset indication with the status, to separately perform a retry for the search without the controller of the chip having to send a rebroadcast.

* * * * *